US012755969B2

(12) United States Patent
Xu et al.

(10) Patent No.: US 12,755,969 B2
(45) Date of Patent: Oct. 6, 2026

(54) LITHIUM-CONTAINING MULTI-PHOSPHATE CATHODE MATERIAL, PREPARATION METHOD THEREFOR, AND SECONDARY BATTERY

(71) Applicants: SHENZHEN DYNANONIC CO., LTD., Shenzhen (CN); FOSHAN DYNANONIC TECHNOLOGY CO., LTD., Foshan (CN)

(72) Inventors: Rongyi Xu, Shenzhen (CN); Yi Yang, Shenzhen (CN); Lingyong Kong, Shenzhen (CN); Yineng Li, Shenzhen (CN); Qifeng Liu, Shenzhen (CN)

(73) Assignees: SHENZHEN DYNANONIC CO., LTD., Shenzhen (CN); FOSHAN DYNANONIC TECHNOLOGY CO., LTD., Foshan (CN)

( * ) Notice: Subject to any disclaimer, the term of this patent is extended or adjusted under 35 U.S.C. 154(b) by 598 days.

(21) Appl. No.: 18/260,977

(22) PCT Filed: Sep. 26, 2022

(86) PCT No.: PCT/CN2022/121274
§ 371 (c)(1),
(2) Date: Jul. 11, 2023

(87) PCT Pub. No.: WO2023/231245
PCT Pub. Date: Dec. 7, 2023

(65) Prior Publication Data
US 2025/0006921 A1 Jan. 2, 2025

(30) Foreign Application Priority Data
Jun. 2, 2022 (CN) ........................ 202210621727.6
Jun. 2, 2022 (CN) ........................ 202210623029.X

(51) Int. Cl.
*H01M 4/58* (2010.01)
*C01G 45/22* (2025.01)
(Continued)

(52) U.S. Cl.
CPC .......... *H01M 4/5825* (2013.01); *C01G 45/22* (2025.01); *H01M 4/366* (2013.01);
(Continued)

(58) Field of Classification Search
CPC .............. C01G 45/22; H01M 10/0525; H01M 2004/021; H01M 2004/028; H01M 4/136;
(Continued)

(56) References Cited

U.S. PATENT DOCUMENTS

2013/0230775 A1 9/2013 Endo
2019/0020015 A1 1/2019 Huang et al.
(Continued)

FOREIGN PATENT DOCUMENTS

CN 104577119 A 4/2015
CN 106129328 A 11/2016
(Continued)

OTHER PUBLICATIONS

Machine translation CN106340639A (Year: 2017).*
(Continued)

*Primary Examiner* — Victoria H Lynch
(74) *Attorney, Agent, or Firm* — Brooks Kushman P.C.

(57) ABSTRACT

The present application belongs to battery materials, and in particular, to a lithium-containing multi-phosphate cathode material and a preparation method therefor, and a secondary battery. The lithium-containing multi-phosphate cathode material includes a single-core multi-shell lithium manganese iron phosphate composite material, the composite material includes a core of lithium iron phosphate or lithium manganese iron phosphate, N lithium manganese iron phos-
(Continued)

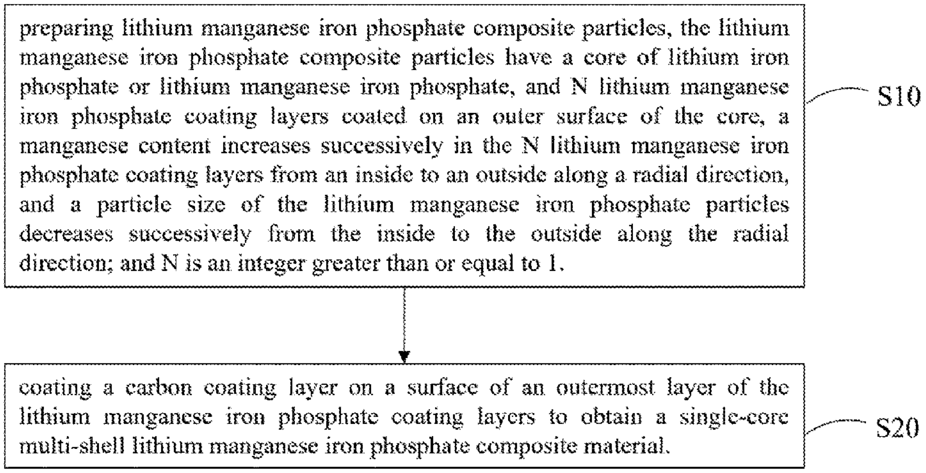

phate coating layers coated on an outer surface of the core, and a carbon coating layer coated on an outermost layer of the composite material; N is an integer greater than or equal to 1; a manganese content in the N lithium manganese iron phosphate coating layers successively increases in a radially outward direction, and a particle size of the lithium manganese iron phosphate particles in the N lithium manganese iron phosphate coating layers successively decreases in the radially outward direction.

20 Claims, 1 Drawing Sheet

(51) Int. Cl.
*H01M 4/36* (2006.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/028* (2013.01)

(58) Field of Classification Search
CPC ........ H01M 4/36; H01M 4/366; H01M 4/505; H01M 4/58; H01M 4/5825; H01M 4/625; Y02E 60/10
See application file for complete search history.

(56) References Cited

U.S. PATENT DOCUMENTS

| | | | | |
|---|---|---|---|---|
| 2022/0006076 | A1 | 1/2022 | Kawamura | |
| 2024/0186490 | A1 * | 6/2024 | Cheng | H01M 4/136 |

FOREIGN PATENT DOCUMENTS

| | | | | |
|---|---|---|---|---|
| CN | 106340639 A | * | 1/2017 | H01M 4/505 |
| CN | 109250698 A | | 1/2019 | |
| CN | 112436120 A | | 3/2021 | |
| CN | 112909245 A | | 6/2021 | |
| CN | 114204015 A | | 3/2022 | |
| CN | 114256448 A | | 3/2022 | |
| CN | 114512649 A | | 5/2022 | |
| CN | 115036466 A | | 9/2022 | |
| CN | 115036476 A | | 9/2022 | |
| JP | 2021009838 A | | 1/2021 | |
| KR | 20150080390 A | | 7/2015 | |
| KR | 20170063420 A | | 6/2017 | |
| WO | WO-2014034775 A1 | * | 3/2014 | H01M 4/362 |
| WO | 2018032569 A1 | | 2/2018 | |
| WO | 2019034105 A1 | | 2/2019 | |

OTHER PUBLICATIONS

Machine translation CN112436120A (Year: 2021).*
Machine translation WO2014034775A1 (Year: 2016).*
National Intellectual Property Administration, PRC, Office Action for Chinese Patent Application No. 202210623029.X dated Jul. 31, 2024. 6 pages.
National Intellectual Property Administration, PRC, Notification of Grant for Chinese Patent Application No. 202210621727.6 dated Jan. 8, 2025. 6 pages.
Xiong, Fan et al. research Progress on Cathode Materials for High Energy Density Lithium-Ion Batteries. School of Chemistry and Chemical Engineering. Hefei University of Technology. Hefei 230009. Anhui, China. Jul. 2018. 11 pages.
National Intellectual Property Administration, PRC, Notification of Grant for Chinese Patent Application No. 202210623029.X dated Dec. 24, 2024. 4 pages.

* cited by examiner

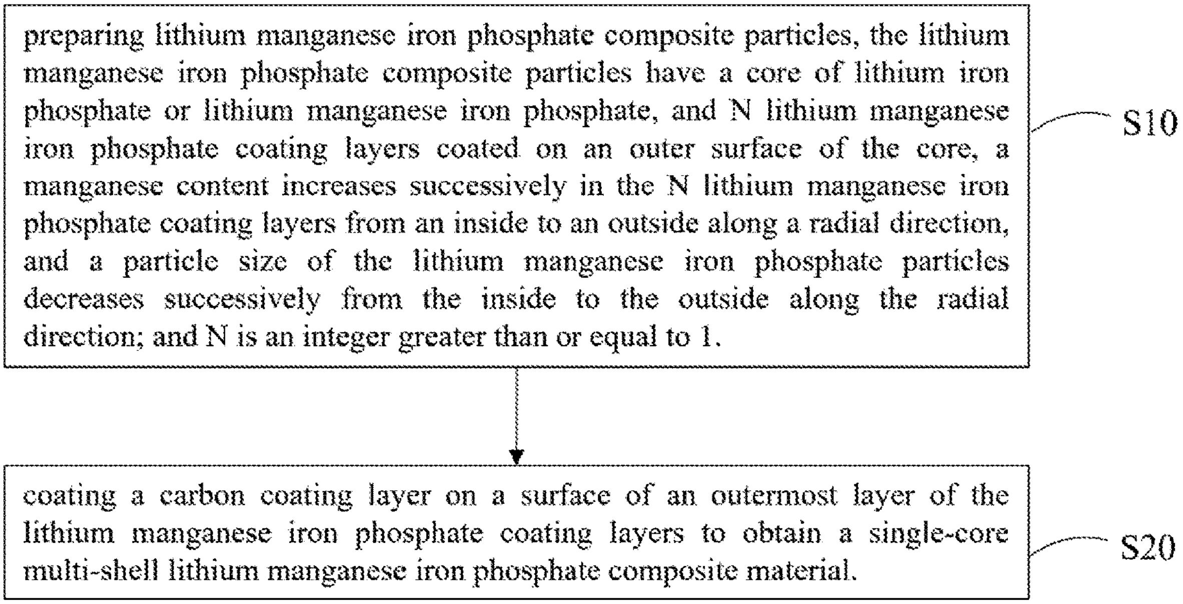
preparing lithium manganese iron phosphate composite particles, the lithium manganese iron phosphate composite particles have a core of lithium iron phosphate or lithium manganese iron phosphate, and N lithium manganese iron phosphate coating layers coated on an outer surface of the core, a manganese content increases successively in the N lithium manganese iron phosphate coating layers from an inside to an outside along a radial direction, and a particle size of the lithium manganese iron phosphate particles decreases successively from the inside to the outside along the radial direction; and N is an integer greater than or equal to 1.
S10
coating a carbon coating layer on a surface of an outermost layer of the lithium manganese iron phosphate coating layers to obtain a single-core multi-shell lithium manganese iron phosphate composite material.
S20

LITHIUM-CONTAINING MULTI-PHOSPHATE CATHODE MATERIAL, PREPARATION METHOD THEREFOR, AND SECONDARY BATTERY

CROSS-REFERENCE TO RELATED APPLICATIONS

This application is a U.S. national phase of International Patent Application No. PCT/CN2022/121274 with an international filing date of Sep. 26, 2022, designating the U.S., now pending, and further claims the benefit of Chinese patent application No. 202210621727.6, filed on Jun. 2, 2022, titled "Multi-phosphate cathode material, preparation method therefor, and secondary battery", the entire contents of which are incorporated herein by reference; and Chinese patent application No. 202210623029.X, filed on Jun. 2, 2022, titled "Multi-phosphate cathode material, preparation method therefor, and secondary battery", the entire contents of which are incorporated herein by reference.

TECHNICAL FIELD

The present application relates to the field of battery materials, and in particular, relates to a lithium-containing multi-phosphate cathode material, a preparation method therefor, and a secondary battery.

BACKGROUND

Lithium-ion batteries are energy storage devices that are widely used across energy storage, power battery, and portable electronic equipment. Lithium-ion batteries have advantages such as high operating voltage, low self-discharge, and good safety. Lithium-ion batteries mainly consist of cathode materials, anode materials, electrolytes, separators, and casings. The cathode materials mainly include lithium cobalt oxide, lithium manganese oxide, nickel-manganese binary system, nickel-cobalt-manganese ternary system, nickel-cobalt-aluminum ternary system, lithium iron phosphate, lithium manganese iron phosphate, and the like. Lithium iron phosphate $LiFePO_4$ has the advantages of a low cost, high safety, and good cycle life. Lithium manganese iron phosphate (LMFP, $LiMn_{1-x}Fe_xPO_4$) is developed based on the modification of lithium iron phosphate, which is a solid solution material composed of lithium iron phosphate and lithium manganese phosphate. Lithium manganese iron phosphate has similar properties as manganese iron phosphate, which has good thermal and chemical stability. Lithium manganese iron phosphate has a higher voltage plateau compared with lithium iron phosphate, and its electrical conductivity and lithium ion conductivity are improved compared with lithium manganese phosphate, thus attracting attentions as a cathode material. However, the conductivity of a single material of lithium manganese iron phosphate is very poor, as pure lithium manganese iron phosphate is almost an insulator, so that the electrochemical performance of the material is difficult to be fully exhibited.

Although the electrical conductivity of material after carbon coating has certain improvements, the electrical conductivity of the material is still poor, and the electrochemical performance of the material is still difficult to be fully exhibited. Existing lithium manganese iron phosphate cathode materials with a multi-layer coating structure achieve improvements and compactness, however, the electrochemical performance of the material is still not fully exhibited, which limits the applications of the materials.

SUMMARY

The present application is to provide a lithium-containing multi-phosphate cathode material, a preparation method therefor, and a secondary battery, aiming at solving, to a certain extent, the defects in the electrochemical performance of the existing lithium manganese iron phosphate cathode materials.

In order to tackle the above problems, embodiments of the present application provide the following technical proposals:

In a first aspect, a lithium-containing multi-phosphate cathode material is provided, which includes a single-core multi-shell lithium manganese iron phosphate composite material; the single-core multi-shell lithium manganese iron phosphate composite material includes a core of lithium iron phosphate or lithium manganese iron phosphate, N lithium manganese iron phosphate coating layers coated on an outer surface of the core, and a carbon coating layer coated on the outermost layer of the single-core multi-shell lithium manganese iron phosphate composite material.

N is an integer greater than or equal to 1; a manganese content in the N lithium manganese iron phosphate coating layers successively increases from the inside to the outside along the radial direction; the lithium manganese iron phosphate coating layer includes lithium manganese iron phosphate particles, and the particle size of the lithium manganese iron phosphate particles in the N lithium manganese iron phosphate coating layers successively decreases from the inside to the outside along the radial direction.

In a second aspect, a preparation method for a lithium-containing multi-phosphate cathode material is provided, which includes the following steps:

- preparing manganese iron phosphate lithium composite particles, the manganese iron phosphate lithium composite particles have a core of lithium iron phosphate or manganese iron phosphate lithium, and N manganese iron phosphate lithium coating layers coated on an outer surface of the core; the manganese content in the N lithium manganese iron phosphate coating layers increases successively from the inside to the outside, and the particle size of lithium manganese iron phosphate particles decreases successively from the inside to the outside along the radial direction; N is an integer greater than or equal to 1; and
- preparing a carbon coating layer on the surface of the outermost layer of the lithium manganese iron phosphate coating layers to obtain the single-core multi-shell lithium manganese iron phosphate composite material.

In a third aspect, a secondary battery is provided, and a cathode material of the secondary battery includes the above-mentioned lithium-containing multi-phosphate cathode material, or a lithium-containing multi-phosphate cathode material prepared by the above-mentioned preparation method.

The advantageous effects of the lithium-containing multi-phosphate cathode material provided by the present application are that, firstly, lithium iron phosphate or lithium manganese iron phosphate with high-iron and low-manganese content having large particles as the core carrier has high rate performance, excellent low-temperature performance, high compaction density, good cycle performance, long service life, high energy retention rate, good structural stability, and high safety performance. Then, the lithium manganese iron phosphate particles are successively coated on the outer surface of the core in the order of the manganese content from low to high and particle size from large to small to form N lithium manganese iron phosphate coating layers, on the one hand, this "annual ring-like" structure of single-core multi-shell structure can not only increase the particle size of lithium manganese iron phosphate particles, increase the compaction density of lithium-containing multi-phosphate cathode materials, but also improve the compactness of the internal filling of composite particles, thereby increasing the compaction density of the lithium-containing multi-phosphate cathode material; on the other hand, the material with high manganese content and poor discharge performance is coated on the outside in the form of small particle size, shortening the distance between the material and the electrolyte, thereby shortening the ion migration transmission channel, and ensuring the electrical conductivity of the composite material. Moreover, the particle size in the lithium manganese iron phosphate coating layer decreases successively from the inside to the outside, and the particles with smaller particle sizes on the outside can be filled in the gaps between larger particles in the previous coating layer to increase the compaction density of the composite material. In addition, the carbon coating layer in the single-core multi-shell lithium manganese iron phosphate composite material can not only improve the stability of the particles, but also facilitate the improvement of electrical conductivity of the material, at the same time, can improve the conductivity of the lithium manganese iron phosphate particles, thereby improving the electrochemical properties of the lithium-containing multi-phosphate cathode material. Therefore, the lithium manganese iron phosphate cathode material of the present application can exhibit high compaction density, good structural stability, good electrical conductivity, and superior electrochemical performance and cycle performance.

The advantageous effects of the preparation method for a lithium-containing multi-phosphate cathode material provided by the present application are that in the lithium manganese iron phosphate composite particles coated with N lithium manganese iron phosphate coating layers on the outer surface of the core, the manganese content increases successively in the N lithium manganese iron phosphate coating layers from the inside to the outside in the radial direction, and the particle size of the lithium manganese iron phosphate particles decreases successively from the inside to the outside along the radial direction. Then, a carbon coating layer is prepared on the outermost layer to obtain a single-core multi-shell lithium manganese iron phosphate composite material. The preparation method for the lithium-containing multi-phosphate cathode material of the present application has a simple process with only two sintering treatments to produce a finished product, and low difficulty in production line transformation, and it is easy to operate, and easy to realize industrialized large-scale production and application. In addition, the single-core multi-shell lithium manganese iron phosphate composite material in the prepared lithium-containing multi-phosphate cathode material enables the lithium-containing multi-phosphate cathode material to possess simultaneously high electrical conductivity, high energy density, high compaction density, and excellent comprehensive electrochemical performance.

The advantageous effects of the secondary battery provided by the present application are that, due to the above lithium-containing multi-phosphate cathode material included therein, and the high electrochemical performances, such as energy density, electrical conductivity, compaction density, safety, stability, etc. of the lithium-containing multi-phosphate cathode material, the electrochemical performance of the secondary battery can be improved.

BRIEF DESCRIPTION OF THE DRAWINGS

In order to more clearly illustrate the technical proposals in embodiments of the present application, accompanying drawings that are used in the description of the embodiments or exemplary existing technologies are briefly introduced hereinbelow. Obviously, the drawings in the following description are merely some embodiments of the present application. For those skilled in the art, other drawings can also be obtained according to these drawings without any creative effort.

The FIGURE is a flow chart of the preparation method for the lithium-containing multi-phosphate cathode material according to an embodiment of the present application.

DETAILED DESCRIPTION OF THE EMBODIMENTS

In order to make the purpose, technical proposals, and advantages of the present application clearer, the application is described in detail below in conjunction with the accompanying drawings and embodiments. It should be understood that the specific embodiments described here are only for the purpose to explain the present application, not to limit the present application.

In order to illustrate the technical proposals of the present application, a detailed description is described below in conjunction with the accompanying drawing and embodiments.

Some embodiments of the present application provide a lithium-containing multi-phosphate cathode material, which includes a single-core multi-shell lithium manganese iron phosphate composite material; the single-core multi-shell lithium manganese iron phosphate composite material includes a core of lithium iron phosphate or lithium manganese iron phosphate, N lithium manganese iron phosphate coating layers coated on an outer surface of the core, and a carbon coating layer coated on the outermost layer of the single-core multi-shell lithium manganese iron phosphate composite material.

N is an integer greater than or equal to 1; the manganese content in the N lithium manganese iron phosphate coating layers successively increases from the inside to the outside along the radial direction; the lithium manganese iron phosphate coating layer includes lithium manganese iron phosphate particles, and the particle size of the lithium manganese iron phosphate particles in the N lithium manganese iron phosphate coating layers successively decreases from the inside to the outside along the radial direction.

A first aspect of the embodiment of the present application provides a lithium-containing multi-phosphate cathode material, which includes a single-core multi-shell lithium manganese iron phosphate composite material; the single-core multi-shell lithium manganese iron phosphate composite material includes, successively along the radially outward direction, a core of lithium iron phosphate or lithium manganese iron phosphate, N lithium manganese iron phosphate coating layers in which the manganese content successively increases, and a carbon coating layer on the outermost layer. The particle size of the lithium manganese iron phosphate particles in the N lithium manganese iron phosphate coating layers successively decreases from the inside to the outside along the radial direction. Since the voltage plateau of the material increases and the discharge performance thereof deteriorates with an increasing manganese content in lithium manganese iron phosphate particles, the particle size needs to be reduced, but the reduction of the particle size will lead to a reduction in the compaction density. Therefore, in some embodiments of the present application, firstly lithium iron phosphate or lithium manganese iron phosphate with high-iron and low-manganese content having large particles as the core carrier has high rate performance, excellent low-temperature performance, high compaction density, good cycle performance, long service life, high energy retention rate, good structural stability, and high safety performance. Then, the lithium manganese iron phosphate particles are successively coated on the outer surface of the core in the order of the manganese content from low to high and particle size from large to small to form N lithium manganese iron phosphate coating layers, on the one hand, this "annual ring-like" structure of single-core multi-shell structure can not only increase the particle size of lithium manganese iron phosphate particles, increase the compaction density of lithium-containing multi-phosphate cathode materials, but also improve the compactness of the internal filling of composite particles, thereby increasing the compaction density of the lithium-containing multi-phosphate cathode material; on the other hand, the material with high manganese content and poor discharge performance is coated on the outside in the form of small particle size, shortening the distance between the material and the electrolyte, thereby shortening the ion migration transmission channel, and ensuring the electrical conductivity of the composite material. Moreover, the particle size in the lithium manganese iron phosphate coating layers decreases successively from the inside to the outside, and the particles with smaller particle sizes on the outside can be filled in the gaps between larger particles in the previous coating layer to increase the compaction density of the composite material. In addition, the carbon coating layer in the single-core multi-shell lithium manganese iron phosphate composite material can not only improve the stability of the particles but also facilitate the improvement of electrical conductivity of the material, at the same time, can improve the conductivity of the lithium manganese iron phosphate particles, thereby improving the electrochemical properties of the lithium-containing multi-phosphate cathode material. Therefore, the lithium manganese iron phosphate cathode material of the present application can exhibit high compaction density, good structural stability, good electrical conductivity, and superior electrochemical performance and cycle performance.

In some embodiments, the molar ratio of manganese element to iron element in the core is (0-1):(2-9); Because the transmission path of lithium ions in the core particles is long, the embodiments of the present application adopt lithium iron phosphate or lithium manganese iron phosphate with high-iron and low-manganese content as the core, so as to improve the electrical conductivity by increasing the iron content, thereby enhancing the electrical properties of the composite material. In some specific embodiments, lithium manganese iron phosphate is used as the core, and the molar ratio of manganese to iron in the core is 1:(2-9). Specifically, the molar ratio of manganese to iron includes but is not limited to 1:2, 1:3, 1:4, 1:5, 1:6, 1:7, 1:8, or 1:9, etc.

In some embodiments, the molar ratios of manganese element to iron element in the N lithium manganese iron phosphate coating layers are respectively independently (1-9):(9-1). The molar ratios of manganese element to iron element in the lithium manganese iron phosphate particles in the plurality of lithium manganese iron phosphate coating layers in the embodiments of the present application are (1-9):(9-1), and the plurality of coating layers are arranged such that the manganese content increases successively from the inside to the outside along the radial direction.

In some embodiments, the molar ratio of manganese element to iron element is 6:4 in the lithium-containing multi-phosphate cathode material. This ratio is advantageous in ensuring the properties of the cathode material, such as electrical conductivity, energy density, compaction density, and the like. If the manganese content increases, the discharge efficiency and compaction density of the lithium-containing multi-phosphate cathode material will decrease; and if the manganese content decreases, the electrochemical properties such as the energy density of the lithium-containing multi-phosphate cathode material will decrease.

In some embodiments, N is an integer ranging from 6 to 10. With the lithium manganese iron phosphate coating layers having a number of layers within this range, the particle size, compaction density, and conductivity of the lithium manganese iron phosphate composite particles provided in the embodiments of the present application can be optimized, so that the best electrochemical performance and cycle performance can be achieved. In some specific embodiments, the layer number N of the lithium manganese iron phosphate coating layers may be but not limited to 6, 7, 8, 9, or 10.

In some embodiments, N is 8; that is, the lithium manganese phosphate composite particles include the lithium manganese phosphate core and eight layers of lithium manganese phosphate coating layers, which, along the radially outward direction, are respectively a first lithium manganese phosphate coating layer, a second lithium manganese phosphate coating layer, a third lithium manganese phosphate coating layer, a fourth lithium manganese phosphate coating layer, a fifth lithium manganese phosphate coating layer, a sixth lithium manganese phosphate coating layer, a seventh lithium manganese phosphate coating layer, and an eighth lithium manganese phosphate coating layer. The molar ratios of manganese to iron in the N lithium manganese iron phosphate coating layers from the inside to the outside in the radial direction are 1:(9-8), 2:(8-7), 3:(7-6), 4:(6-5), 5:(5-4), 6:(4-3), 7:(3-2), and 8:(2-1). The manganese-iron molar ratios in the lithium manganese iron phosphate core and each layer of the lithium manganese iron phosphate coating layers provided in this embodiment increase radially from the inside to the outside, that is, the manganese content increases from the inside to the outside in the radial direction. Because an increase in the manganese content will lead to a reduction in the conductivity, therefore, in the coating structure of the lithium-containing multi-phosphate cathode material, the lithium manganese iron phosphate particles with a high manganese content and poor conductivity is placed in the outer layer, which can shorten the lithium ion transmission distance and increase the conductivity. In addition, within the range of the mass ratio of lithium manganese iron phosphate in the eight layers of lithium manganese iron phosphate coating layers provided in this embodiment, an appropriate thickness of each layer of lithium manganese iron phosphate coating layers can be ensured, and the each layer of lithium manganese iron phosphate coating layers can be more tightly bound, which can increase the compaction density of the lithium-containing multi-phosphate cathode material, thereby enabling good structural stability and excellent electrochemical performance and cycle performance. Also, it is beneficial to adjust the molar ratio of manganese to iron elements in the lithium manganese iron phosphate cathode material containing the eight layers of lithium manganese iron phosphate coating layers to 6:4, so that the lithium-containing multi-phosphate cathode material has optimal comprehensive properties such as conductivity, compaction density and energy density, and the like.

In some embodiments, the lithium-containing multi-phosphate cathode material includes a plurality of single-core multi-shell lithium manganese iron phosphate composite materials of different sizes. In the plurality of single-core multi-shell lithium manganese iron phosphate composite materials, the particle sizes of the cores are different, the thicknesses of respective coating layers are different, and the numbers of layers of the lithium manganese iron phosphate coating layers are the same or different. The plurality of single-core multi-shell lithium manganese iron phosphate composite materials in the lithium-containing multi-phosphate cathode material in the embodiment of the present application have similar or identical structures, but the sizes of the cores and the coating layers are different. The gradation of the composite materials not only ensures the electrochemical performance of the lithium-containing multi-phosphate cathode material, but also facilitates improving the overall compaction density and the energy density of the lithium-containing multi-phosphate cathode material. Therefore, the lithium-containing multi-phosphate cathode material has excellent comprehensive electrochemical properties such as high electrical conductivity, high energy density, and high compaction density.

In some embodiments, the lithium-containing multi-phosphate cathode material includes three types of single-core multi-shell lithium manganese iron phosphate composite materials which have the same structure and different sizes, namely a first composite material, a second composite material, and a third composite material. Through the three types of single-core multi-shell lithium manganese iron phosphate composite materials with the same or similar structure but different sizes, a better gradation relationship can be formed, which aids in improving the overall compaction density and the energy density of the lithium-containing multi-phosphate cathode material.

In some embodiments, in the first composite material, the second composite material, and the third composite material, the ratio between particle sizes of the cores is (1-1.05):(2-2.1):(4-4.2), the ratio between the thickness of respective coating layers is (1-1.05):(2-2.1):(4-4.2); that is, the materials of the cores and the coatings layers and the number of the coating layers are the same across the first composite material, the second composite material, and the third composite material, while the particle size of the cores and the thickness of respective coating layers thereof have a proportional relationship of (1-1.05):(2-2.1):(4-4.2). This proportional relationship enables the first composite material, the second composite material, and the third composite material to have three different sizes, and with the three types of composite materials having the same or similar structure but different sizes as the lithium-containing multi-phosphate cathode material, the small-sized composite material can be filled in the gap of the large-sized composite materials to form a gradation, which not only ensures the electrochemical performance of the lithium-containing multi-phosphate cathode material, but also helps to improve the overall compaction density and energy density of the lithium-containing multi-phosphate cathode material.

In some embodiments, the mass ratio between the first composite material, the second composite material, and the third composite material is 1:(2-4):(5-7). In the first composite material, the second composite material, and the third composite material in the embodiment of the present application, the particle sizes of respective cores and the thicknesses of respective coating layers have a ratio of (1-1.05):(2-2.1):(4-4.2), thus with the same or similar structure but different sizes of the composite materials, a gradation is carried out according to a mass ratio of 1:(2-4):(5-7), so that a better gradation among the composite materials of three sizes can be achieved, facilitating improving the compaction density and electrochemical performance of the lithium-containing multi-phosphate cathode material. In some specific embodiments, in the lithium-containing multi-phosphate cathode material, the mass ratio between the first composite material, the second composite material, and the third composite material includes but is not limited to 1:2:5, 1:2:6, 1:2:7, 1:3:5, 1:3:6, 1:3:7, 1:4:5, 1:4:6, 1:4:7, and the like.

In some embodiments, the ratio between the particle sizes of the first composite material, the second composite material, and the third composite material is (1.8-8):(3-16):(7-32), the three composite materials with particle sizes at this ratio can form a continuous gradation, and particles of the composite material are continuously successively distributed from large to small, with an appropriate proportion of each grade. The mixed cathode active material formed according to this particle size ratio is more beneficial to enhancing the compaction density and overall electrochemical performance of the lithium-containing multi-phosphate cathode material. In some embodiments, the ratio between the particle sizes of the first composite material, the second composite material, and the third composite material includes but is not limited to (2-7):(3-15):(8-31), (2-6):(3-15):(8-31), (2-5):(3-14):(8-30), (3-7):(4-15):(10-31), and the like.

In some embodiments, the particle size of the first composite material ranges from 1.8 μm to 8 μm, the particle size of the second composite material ranges from 3 μm to 16 μm, and the particle diameter of the third composite material ranges from 7 μm to 32 μm. The particle sizes of the first composite material, the second composite material, and the third composite material in the embodiments of the present application not only ensure electrochemical properties of the lithium-containing multi-phosphate cathode material such as the electrical conductivity and energy density, but also help to improve the compaction density of the lithium-containing multi-phosphate cathode material. In some specific embodiments, the particle size of the first composite material includes but is not limited 1.8 μm, 3.5 μm, 4 μm, 8 μm, 6 μm, etc.; the particle size of the second composite material includes but not limited to 3.5 μm, 7 μm, 10 μm, 13 μm, 16 μm, and the like; and the particle size of the third composite material is 7 μm, 14 μm, 10 μm, 17 μm, 20 μm, 25 km, 30 km, 32 μm, and the like.

In some embodiments, at least one composite material in the first composite material, the second composite material, and the third composite material includes eight lithium manganese iron phosphate coating layers; the particle sizes of the lithium manganese iron phosphate particles in the eight lithium manganese iron phosphate coating layers radially from inside to outside range from 320 nm to 360 nm, from 280 nm to 320 nm, from 240 nm to 280 nm, from 200 nm to 240 nm, from 160 nm to 200 nm, from 120 nm to 240 nm, from 80 nm to 120 nm, and from 50 nm to 80 nm. In the embodiments of the present application, since the manganese content in the coating layers along the radial direction increases successively, and the voltage plateau increases as the manganese content increases, so that through the coating structure with the particle sizes decreasing from the inside to the outside along the radial direction, the discharge efficiency of the material can be improved, and the compaction density of the composite materials can be increased.

In some embodiments, the first composite material, the second composite material, and the third composite material all include eight lithium manganese iron phosphate coating layers. The gradation of single-core multi-shell lithium manganese iron phosphate composite materials with the same structure and different sizes is more beneficial to improving the stability of the lithium-containing multi-phosphate cathode material.

In some embodiments, in the first composite material, the particle size of the core ranges from 360 nm to 1600 nm, and molar ratios of manganese to iron in the eight lithium manganese iron phosphate coating layers from inside to outside in the radial direction are successively 1:(9-8), 2:(8-7), 3:(7-6), 4:(6-5), 5:(5-4), 6:(4-3), 7:(3-2), and 8:(2-1), the thicknesses range successively from 320 nm to 360 nm, from 280 nm to 320 nm, from 240 nm to 280 nm, from 200 nm to 240 nm, from 160 nm to 200 nm, from 120 nm to 1600 nm, from 80 nm to 2400 nm, and from 50 nm to 800 nm. That is, for the lithium manganese iron phosphate coating layer having a molar ratio of manganese to iron of 1:(9-8), the thickness thereof ranges from 320 nm to 360 nm; for the lithium manganese iron phosphate coating layer having a molar ratio of manganese to iron of 2:(8-7), the thickness thereof ranges from 280 nm to 320 nm; for the lithium manganese iron phosphate coating layer having a molar ratio of manganese to iron of 3:(7-6), the thickness thereof ranges from 240 nm to 280 nm; for the lithium manganese iron phosphate coating layer having a molar ratio of manganese to iron of 4:(6-5), the thickness thereof ranges from 200 nm to 240 nm; for the lithium manganese iron phosphate coating layer having a molar ratio of manganese to iron of 5:(5-4), the thickness thereof ranges from 160 nm to 200 nm; for the lithium manganese iron phosphate coating layer having a molar ratio of manganese to iron of 6:(4-3), the thickness thereof ranges from 120 nm to 1600 nm; for the lithium manganese iron phosphate coating layer having a molar ratio of manganese to iron of 7:(3-2), the thickness thereof ranges from 80 nm to 2400 nm; for the lithium manganese iron phosphate coating layer having a molar ratio of manganese to iron of 8:(2-1), the thickness thereof ranges from 50 nm to 800 nm. The ratio of manganese to iron in the core and each coating layer and the coating thickness of the first composite material enable the first composite material to have a suitable particle size, which is conducive to simultaneously improving comprehensive properties, such as the energy density, electrical conductivity, and compaction density of the lithium-containing multi-phosphate cathode material.

In some embodiments, in the second composite material, the particle size of the core ranges from 720 nm to 3200 nm, and molar ratios of manganese to iron in the eight lithium manganese iron phosphate coating layers from inside to outside in the radial direction are successively 1:(9-8), 2:(8-7), 3:(7-6), 4:(6-5), 5:(5-4), 6:(4-3), 7:(3-2), and 8:(2-1), and the thicknesses range successively from 640 nm to 720 nm, from 560 nm to 640 nm, from 480 nm to 560 nm, from 400 nm to 480 nm, from 320 nm to 400 nm, from 240 nm to 3200 nm, from 160 nm to 4800 nm, and from 100 nm to 1600 nm. That is, in the second composite material, the molar ratios of manganese to iron in the plurality of lithium manganese iron phosphate coating layers in the radially outward direction are successively 1:(9-8), 2:(8-7), 3:(7-6), 4:(6-5), 5:(5-4), 6:(4-3), 7:(3-2), and 8:(2-1), while the thicknesses of respective coating layers in the radially outward direction range successively from 640 nm to 720 nm, from 560 nm to 640 nm, from 480 nm to 560 nm, from 400 nm to 480 nm, from 320 nm to 400 nm, from 240 nm to 3200 nm, from 160 nm to 4800 nm, and from 100 nm to 1600 nm. The structure and material of the second composite material in the embodiment of the present application are the same as those of the first composite material, except that the particle size of the core and the thickness of each coating layer are increased by a certain proportion, so that the overall particle size of the second composite material increases, thus the second composite material is also beneficial to improving the comprehensive properties of the lithium-containing multi-phosphate cathode material such as energy density, electrical conductivity, and compaction density.

In some embodiments, in the third composite material, the particle size of the core ranges from 1440 nm to 6400 nm, and molar ratios of manganese to iron in the eight lithium manganese iron phosphate coating layers from inside to outside in the radial direction are successively 1:(9-8), 2:(8-7), 3:(7-6), 4:(6-5), 5:(5-4), 6:(4-3), 7:(3-2), and 8:(2-1), and the thicknesses range successively from 1280 nm to 1440 nm, from 1120 nm to 1280 nm, from 960 nm to 1120 nm, from 800 nm to 960 nm, from 640 nm to 800 nm, from 480 nm to 6400 nm, from 320 nm to 9600 nm, and from 200 nm to 3200 nm. That is, in the third composite material, the molar ratios of manganese to iron in the plurality of lithium manganese iron phosphate coating layers in the radially outward direction are successively 1:(9-8), 2:(8-7), 3:(7-6), 4:(6-5), 5:(5-4), 6:(4-3), 7:(3-2), and 8:(2-1), while the thicknesses of respective coating layers in the radially outward direction range successively from 1280 nm to 1440 nm, from 1120 nm to 1280 nm, from 960 nm to 1120 nm, from 800 nm to 960 nm, from 640 nm to 800 nm, from 480 nm to 6400 nm, from 320 nm to 9600 nm, and from 200 nm to 3200 nm. The structure and material of the third composite material in the embodiment of the present application are the same as those of the first composite material, except that the particle size of the core and the thickness of each coating layer are increased by a certain proportion, so that the overall particle size of the third composite material increases, thus the third composite material is also beneficial to improving the comprehensive properties of the lithium-containing multi-phosphate cathode material such as energy density, electrical conductivity, and compaction density.

In some embodiments, in the single-core multi-shell lithium manganese iron phosphate composite material, the mass percentage of carbon coating layer ranges from 1 wt % to 3 wt %. In the composite material, the carbon coating layer of this mass percentage is beneficial to regulating the size of the single-core multi-shell lithium manganese iron phosphate composite material, so as to prevent it from agglomerating and forming large particles in the subsequent processing process, and effectively improve the conductivity of the single-core multi-shell lithium manganese iron phosphate composite material, thereby improving the electrochemical performance of the composite material. If the content of the carbon coating layer is too low, the coating is incomplete, which is not conducive to improving the structural and performance stability of the single-core multi-shell lithium manganese iron phosphate composite material; if the content of the carbon coating layer is too high, then excessive coating of the single-core multi-shell lithium manganese iron phosphate composite material by the carbon coating layer will hinder the performance of the material, and will also reduce the content of the lithium manganese iron phosphate material in the composite material, thereby reducing the energy density of the material. In some specific embodiments, in the single-core multi-shell lithium manganese iron phosphate composite material, the mass percentage of the carbon coating layer includes but is not limited to 1 wt %, 2 wt %, 3 wt %, and so on.

In some embodiments, the thickness of carbon coating layer is from 1 nm to 3 nm. This thickness can aid in forming of a complete coating layer, as well as avoid lowering the energy density of the composite material due to the carbon coating layer being too thick.

In some embodiments, the core is selected from carbon-coated lithium iron phosphate or carbon-coated lithium manganese iron phosphate, the mass percentage of a carbon coating material ranges from 1 wt % to 3 wt %; the carbon material of this content is not only conducive to improving the electrical conductivity of the lithium manganese iron phosphate material, but also be able to completely cover the lithium manganese iron phosphate particles, prevent the lithium manganese iron phosphate from being oxidized, inhibit the particle growth, and improve the structural stability of the lithium manganese iron phosphate particles. If the content of the carbon material is too high, the coating on the lithium manganese iron phosphate particles by the carbon coating layer will be too tight, this will reduce the structural stability of the material during a secondary sintering process, hinder the performance of the material, reduce the content of the lithium manganese iron phosphate material in the composite material, thereby reducing the energy density of the material. If the content of the carbon material is too low, the coating will be incomplete, which is not conducive to improving the structure and performance stability of the lithium manganese iron phosphate particles. In some embodiments, the mass percentage of carbon material in the lithium manganese iron phosphate particles includes but not limited to 1 wt %, 2 wt %, 3 wt %, and so on.

In some embodiments, the lithium manganese iron phosphate particles are selected from carbon-coated lithium manganese iron phosphate particles, and the mass percentage of the carbon coating material ranges from 1 wt % to 3 wt %. The carbon material of this content is beneficial to improving the conductivity of the lithium iron phosphate material, and also aids in a complete coating of the lithium iron phosphate particles, preventing the oxidation of the lithium iron phosphate and inhibiting the growth of the particles, thereby improving the structural stability of the lithium iron phosphate particles. If the content of the carbon material is too low, the coating will be incomplete, which is not conducive to improving the structural and performance stability of the material; and if the content of the carbon material is too high, it will hinder the performance of the material and also reduce the energy density of the material. In some embodiments, the mass percentage of the carbon material in the core of lithium iron phosphate or lithium manganese iron phosphate includes but not limited to 1 wt %, 2 wt %, 3 wt %, and so on.

In some specific embodiments, the lithium manganese iron phosphate core and the surface of the lithium manganese iron phosphate particles in each of the lithium manganese iron phosphate coating layers are provided with a carbon protective layer. The thickness of the carbon protective layer is less than 1 nm. In this embodiment, the carbon protective layers with a thickness of less than 1 nm provided on the surface of the lithium manganese iron phosphate core and the lithium manganese iron phosphate particles in each of the lithium manganese phosphate coating layers can protect ferromanganese from oxidation, thereby improving the stability of lithium manganese iron phosphate.

The lithium-containing multi-phosphate cathode material of the embodiments of the present application may be prepared by the following method.

As shown in the FIGURE, a second aspect of the embodiment of the present application provides a preparation method for lithium-containing multi-phosphate cathode material, including the following steps:

In step S10: lithium manganese iron phosphate composite particles are prepared, the lithium manganese iron phosphate composite particles have a core of lithium iron phosphate or lithium manganese iron phosphate, and N lithium manganese iron phosphate coating layers are coated on the outer surface of the core; in the lithium manganese iron phosphate coating layers from the inside to the outside along the radial direction, the manganese content increases successively, and the particle size of lithium manganese iron phosphate particles decreases successively; N is an integer greater than or equal to 1; and In step S20: a carbon coating layer is prepared on the surface of the outermost lithium manganese iron phosphate coating layer to obtain a single-core multi-shell lithium manganese iron phosphate composite material.

The second aspect of the embodiment of the present application provides a preparation method for lithium-containing multi-phosphate cathode material, through which the lithium manganese iron phosphate composite particles are prepared with a core of lithium iron phosphate or lithium manganese iron phosphate, and N lithium manganese iron phosphate coating layers coated on the outer surface of the core, and in the lithium manganese iron phosphate coating layers from the inside to the outside along the radial direction, the manganese content increasing successively, and the particle size of lithium manganese iron phosphate particles decreasing successively. And then, a carbon coating layer is prepared on the surface of the outermost lithium manganese iron phosphate coating layer to obtain a single-core multi-shell lithium manganese iron phosphate composite material. The preparation method for lithium-containing multi-phosphate cathode material of the embodiment of the present application has a simple process with only two sintering treatments to produce a finished product, and low difficulty in production line transformation, and it is easy to operate, and easy to realize industrialized large-scale production and application. In addition, the single-core multi-shell lithium manganese iron phosphate composite material in the prepared lithium-containing multi-phosphate cathode material enables the lithium-containing multi-phosphate cathode material to possess simultaneously high electrical conductivity, high energy density, high compaction density, and excellent comprehensive electrochemical performance.

In some embodiments, in the above-mentioned step S10, the step of preparing lithium manganese iron phosphate composite particle includes:

Step S11: lithium iron phosphate particles and lithium manganese iron phosphate particles with different ratios of manganese to iron are prepared respectively; and Step S12: lithium iron phosphate particles or lithium manganese iron phosphate particles are used as the core, the outer surface of the inner core is coated with lithium manganese iron phosphate particles with different manganese to iron ratios to form N lithium manganese iron phosphate coating layers in which the manganese content increases radially from the inside to the outside, and lithium manganese iron phosphate composite particles are obtained;

In some embodiments, in the above-mentioned step S11, the method for preparing lithium iron phosphate particles includes but not limited to, after mixing an iron source, lithium source, phosphorus source and carbon source, carrying out sintering treatment, so that carbon-coated lithium iron phosphate single crystal particles are obtained.

In some embodiments, the carbon source includes but not limited to at least one in sucrose, glucose, oxalic acid, salicylic acid, citric acid, tartaric acid, malic acid, glycine, ethylenediaminetetraacetic acid, and succinic acid, these carbon sources can be converted into gaseous hydrocarbons during the high-temperature sintering process, and can be deposited on the surface of lithium iron phosphate particles to form a carbon coating layer.

In some embodiments, the added mass percentage of carbon material ranges from 1 wt % to 3 wt %, the carbon material of this content helps to improve the electrical conductivity of lithium iron phosphate material, and is capable of fully coating lithium iron phosphate particles, preventing the oxidation of lithium iron phosphate, inhibiting particle growth, and improving the structural stability of the lithium iron phosphate particles.

In some specific embodiments, iron phosphate and lithium carbonate are mixed, and sintered for 8 hrs to 10 hrs at a temperature ranging from 650° C. to 750° C., to obtain the carbon-coated lithium iron phosphate particles. The particle size of the lithium iron phosphate particles in the above-mentioned embodiments of the present application can be reduced by lowering the sintering temperature and sintering time, thus flexible to meet the requirements for the particle size of the core during the preparation of single-core multi-shell lithium manganese iron phosphate composite material.

In some embodiments, in the above-mentioned step S11, the preparation method for the lithium manganese iron phosphate particles of different manganese-to-iron ratios includes: the manganese source and iron source are mixed with lithium source and carbon source, in which the molar ratios of the manganese source to the iron source are respectively 1:(9-8), 2:(8-7), 3:(7-6), 4:(6-5), 5:(5-4), 6:(4-3), 7:(3-2) or 8:(2-1), and then sintered respectively to obtain lithium manganese iron phosphate particles with different ratios of manganese to iron. In some embodiments, manganese phosphate is used as the manganese source, and iron phosphate is used as the iron source, which can not only provide manganese and iron elements, but also provide a phosphorus source. In some embodiments, the molar ratio of the total molar amount of the manganese source and the iron source to the lithium source and the phosphorus source is 1:1:1. In some embodiments, the carbon source includes but is not limited to at least one of sucrose, glucose, oxalic acid, salicylic acid, citric acid, tartaric acid, malic acid, glycine, ethylenediaminetetraacetic acid, and succinic acid. During the high-temperature sintering process, theses carbon sources can be converted into gaseous hydrocarbons, and can be deposited on the surface of lithium manganese iron phosphate particles to form a carbon coating layer.

In some embodiments, in the above-mentioned step S12, lithium iron phosphate particles or lithium manganese iron phosphate particles are used as the core, the lithium manganese iron phosphate particles with different ratios of manganese to iron are made into slurries, and then coated on the surface of the core such that the manganese content increases from the inside to the outside along the radial direction, forming a plurality of carbon-coated lithium manganese iron phosphate coating layers. In some specific embodiments, the lithium iron phosphate particles are used as the core, and from the inside to the outside in the radial direction, the first coating layer is a lithium manganese iron phosphate coating layer with a manganese-iron ratio of 1:(9-8), the second coating layer is a lithium manganese iron phosphate coating layer with a manganese-iron ratio of 2:(8-7), the third coating layer is a lithium manganese iron phosphate coating layer with a manganese-iron ratio of 3:(7-6), the fourth coating layer is a lithium manganese iron phosphate coating layer with a manganese-iron ratio of 4:(6-5), the fifth coating layer is a lithium manganese iron phosphate coating layer with a manganese-iron ratio of 5:(5-4), the sixth coating layer is a lithium manganese iron phosphate coating layer with a manganese-iron ratio of 6:(4-3), the seventh coating layer is a lithium manganese iron phosphate coating layer with a manganese-iron ratio of 7:(3-2), and the eighth coating layer is a lithium manganese iron phosphate coating layer with a manganese-iron ratio of 8:(2-1).

In some embodiments, when preparing the lithium manganese iron phosphate particles of different manganese-to-iron ratios, the higher the manganese content, the lower the sintering temperature, and when the molar ratios of manganese source to iron source are 1:(9-8), 2:(8-7), 3:(7-6), 4:(6-5), 5:(5-4), 6:(4-3), 7:(3-2) or 8:(2-1), the corresponding sintering temperatures are in a range from 560° C. to 600° C., from 530° C. to 560° C., from 500° C. to 530° C., from 470° C. to 500° C., from 440° C. to 470° C., from 410° C. to 440° C., from 380° C. to 410° C., and from 350° C. to 380° C. The sintering time includes but is not limited to from 8 hrs to 24 hrs. That is, when the molar ratio of the manganese source to the iron source is 1:(9-8), the manganese source, iron source, lithium source, phosphorus source, and carbon source are mixed and then sintered at a temperature ranging from 560° C. to 600° C. to prepare the carbon-coated lithium manganese iron phosphate particles with a manganese-iron ratio of 1:(9-8). When the molar ratio of manganese source to iron source is 2:(8-7), the manganese source, iron source, lithium source, phosphorus source, and carbon source are mixed and then sintered at a temperature ranging from 530° C. to 560° C. to prepare the carbon-coated lithium manganese iron phosphate particles with a manganese-iron ratio of 2:(8-7). When the molar ratio of manganese source to iron source is 3:(7-6), the manganese source, iron source, lithium source, phosphorus source, and carbon source are mixed and then sintered at a temperature ranging from 500° C. to 530° C. to prepare the carbon-coated lithium manganese iron phosphate particles with a manganese-iron ratio of 3:(7-6). When the molar ratio of manganese source to iron source is 4:(6-5), the manganese source, iron source, lithium source, phosphorus source, and carbon source are mixed and then sintered at a temperature ranging from 470° C. to 500° C. to prepare the carbon-coated lithium manganese iron phosphate particles with a manganese-iron ratio of 4:(6-5). When the molar ratio of manganese source to iron source is 5:(5-4), the manganese source, iron source, lithium source, phosphorus source, and carbon source are mixed and then sintered at a temperature ranging from 440° C. to 470° C. to prepare the carbon-coated lithium manganese iron phosphate particles with a manganese-iron ratio of 5:(5-4). When the molar ratio of manganese source to iron source is 6:(4-3), the manganese source, iron source, lithium source, phosphorus source, and carbon source are mixed and then sintered at a temperature ranging from 410° C. to 440° C. to prepare the carbon-coated lithium manganese iron phosphate particles with a manganese-iron ratio of 6:(4-3). When the molar ratio of manganese source to iron source is 7:(3-2), the manganese source, iron source, lithium source, phosphorus source, and carbon source are mixed and then sintered at a temperature ranging from 380° C. to 410° C. to prepare the carbon-coated lithium manganese iron phosphate particles with a manganese-iron ratio of 7:(3-2). When the molar ratio of manganese source to iron source is 8:(2-1), the manganese source, iron source, lithium source, phosphorus source, and carbon source are mixed and then sintered at a temperature ranging from 350° C. to 380° C. to prepare the carbon-coated lithium manganese iron phosphate particles with a manganese-iron ratio of 8:(2-1). In the above embodiments of the present application, at higher sintering temperature, lithium manganese iron phosphate particles having larger particle size are prepared, and at lower sintering temperature, lithium manganese iron phosphate particles having smaller particle size are prepared. In the lithium manganese iron phosphate particles, the higher the manganese content, the higher the voltage plateau of the material and the worse the discharge performance. Therefore, in the embodiments of the present application, as the manganese content in the lithium manganese iron phosphate particles increases, the sintering temperature is gradually reduced, so that the particle size of the prepared lithium manganese iron phosphate particles decreases gradually with the increase in the manganese content, thereby shortening the ion migration transmission path.

In some other embodiments, the step of preparing lithium manganese iron phosphate composite particles includes:

step S13: ferric phosphate or ferromanganese phosphate is used as the core, and coating N ferromanganese phosphate coating layers on the surface of the core to obtain ferromanganese phosphate composite particles; and step S14: the ferromanganese phosphate composite particles and the lithium source are mixed and subjected to hydrothermal reaction to obtain the lithium manganese iron phosphate composite particles.

In the preparation method for the lithium-containing multi-phosphate cathode material provided by the embodiment of the application, the ferromanganese phosphate core is first prepared, and N ferromanganese phosphate coating layers are coated on the surface of the ferromanganese phosphate core to form ferromanganese phosphate composite particle. Through multi-layer coating, the particle size of lithium manganese iron phosphate composite particles can be increased, and the compaction density and conductivity of lithium manganese iron phosphate cathode material can be improved. Then the ferromanganese phosphate composite particles and the lithium source are mixed and dissolved, so that the ferromanganese phosphate composite particles and the lithium source are reacted in the solution state, which can reduce the difficulty of synthesis, the required reaction temperature is lower, and the reaction is more complete at the same time, and the product converting rate is high, and the obtained lithium manganese iron phosphate composite particles have good uniformity, so that the stability and cycle performance of lithium manganese iron phosphate are better.

In some embodiments, in above-mentioned step S13, the method for preparing the ferromanganese phosphate core includes: after the iron source and the manganese source are mixed, sintering treatment carried out, and ferromanganese phosphate particle core is obtained. The iron source may be iron phosphate, and the manganese source may be manganese phosphate. The temperature of sintering treatment ranges from 640° C. to 660° C., and the time ranges from 5 hrs to 8 hrs. Specifically, the temperature of the sintering treatment ranges from 640° C. to 650° C., and the time ranges from 7 hrs to 8 hrs.

In some embodiments, the method for preparing ferromanganese phosphate core further includes: ferromanganese phosphate particles are sintered with a carbon source, to form a carbon protective layer on the surface of ferromanganese phosphate particles, and a ferromanganese phosphate particle core having the carbon protective layer on the surface is formed. The carbon source is added in a mass percentage ranging from 1 wt % to 3 wt %. In some specific embodiments, the thickness of the carbon protective layer is less than 1 nm, which can protect the ferromanganese from being oxidized, thereby improving the stability of the ferromanganese phosphate.

In some embodiments, the method for coating the N ferromanganese phosphate coating layers on the surface of the core includes: the iron source and the manganese source are mixed such that the molar ratio of the manganese source to the iron source increases successively, and a second sintering treatment is carried out to obtain ferromanganese phosphate particles with the manganese-iron molar ratio increasing successively; the ferromanganese phosphate particles with different manganese-iron molar ratios are respectively made into slurry, the slurries are successively coated on the surface of the ferromanganese phosphate core, with the manganese-iron molar ratio increasing successively from the inside to the outside, to form N ferromanganese phosphate coating layers. In some specific embodiments, the temperature of the sintering treatment ranges from 590° C. to 340° C., and the time ranges from 5 hrs to 8 hrs. By controlling the temperature of the sintering treatment, the particle size of the ferromanganese phosphate particles can be regulated, so that the molar ratio of manganese to iron of the lithium manganese iron phosphate particles is inversely proportional to the particle size. As the molar ratio of manganese to iron (i.e. manganese element content) in the lithium manganese iron phosphate particles increases, by reducing the sintering temperature, the ferromanganese phosphate particles of which the particle size gradually decreases as the manganese content gradually increases can be formed, so as to reduce the distance of the lithium ion transmission.

In some specific embodiments, the method of coating the slurries on the surface of the core such that the manganese-iron ratio increases radially from the inside to the outside includes: spraying the ferromanganese phosphate slurries on the surface of the ferromanganese phosphate core by spray drying such that the molar ratios of manganese to iron are from low to high, successively forming the first ferromanganese phosphate coating layer, the second ferromanganese phosphate coating layer, the third ferromanganese phosphate coating layer . . . the N-1th ferromanganese phosphate coating layer, and the Nth ferromanganese phosphate coating layer.

In some embodiments, the method for coating N ferromanganese phosphate coating layers on the surface of the ferromanganese phosphate core also includes: the ferromanganese phosphate particles of different molar ratios of manganese to iron are sintered with carbon source respectively, a carbon protective layer is formed on the surface of the ferromanganese particles, and ferromanganese phosphate particles with different molar ratios of manganese to iron coated with the carbon protective layer are obtained. The carbon source is added in a mass percentage ranging from 1 wt % to 3 wt %. In some specific embodiments, the thickness of the carbon protective layer is less than 1 nm, which can protect ferromanganese from oxidation, thereby improving the stability of lithium manganese iron phosphate.

In some embodiments, in the above-mentioned step S14, the condition of hydrothermal reaction includes: a pH value ranging from 6 to 9, a reaction temperature ranging from 70° C. to 90° C., and a reaction time ranging from 1 hr to 3 hrs. The conditions of the reaction treatment include: a pH value ranging from 6 to 9, a reaction temperature ranging from 70° C. to 90° C., and a reaction time ranging from 1 hr to 3 hrs. Specifically, the conditions of the reaction include: a pH value ranging from 7 to 8, a reaction temperature ranging from 75° C. to 85° C., and a reaction time ranging from 2 hrs to 3 hrs. Within the above range of reaction conditions provided in this example, the ferromanganese phosphate composite particles and the lithium source can fully react, the finished product yield is high, and the obtained lithium manganese iron phosphate composite particles have good uniformity, so that the stability and cycle performance of the lithium manganese iron phosphate reaches an optimum.

In some specific embodiments, the manganese source and the iron source are mixed with the carbon source, followed by sintering treatment respectively, and the ferromanganese phosphate particles of different manganese-iron ratios are obtained respectively; the ferromanganese phosphate composite particles and the lithium source are mixed, and after a hydrothermal reaction being carried out for 1 hr to 3 hrs at a pH value ranging from 6 to 9 and a temperature ranging from 70° C. to 90° C., are dried at a temperature ranging from 180° C. to 220° C. to obtain lithium manganese iron phosphate particles with different manganese-iron ratios.

In some embodiments, in the above-mentioned step S20, the step of preparing the carbon coating layer on the surface of the outermost lithium manganese iron phosphate coating layer includes but is not limited to, mixing the coating material having a plurality of lithium manganese iron phosphate coatings layers with the carbon material and carrying out a sintering treatment, so that a carbon coating layer is formed on the outer surface of the coating material by the carbon material during the second sintering process. In some embodiments, the carbon source includes but is not limited to at least one of sucrose, glucose, oxalic acid, salicylic acid, citric acid, tartaric acid, malic acid, glycine, ethylenediaminetetraacetic acid, and succinic acid, these carbon sources can be converted into gaseous hydrocarbons during the high-temperature sintering process, which can be deposited on the surface of the material to form a carbon coating layer.

In some specific embodiments, the mass percentage of added carbon source is 15 wt % to 20 wt %, within this range of the carbon source provided by the present embodiment, a carbon coating layer of a suitable thickness can be formed, which not only can effectively improve the electrical conductivity of the cathode material, but also ensure the proportion of lithium manganese iron phosphate composite particles in the cathode material, thereby ensuring the good electrochemical performance of the composite material. In addition, the continuous growth of lithium manganese iron phosphate composite particles can also be controlled, and the particle size can be maintained. In some embodiments, the conditions of the sintering treatment include sintering in an inert atmosphere at a temperature ranging from 650° C. to 750° C. for 5 hrs to 8 hrs. Specifically, the inert atmosphere may be nitrogen or argon. Sintering at the conditions of the first sintering treatment provided in this embodiment can generate a stable carbon coating layer.

In some embodiments, the mass percentage of the added carbon material ranges from 1 wt % to 3 wt % in the single-core multi-shell lithium manganese iron phosphate composite material. In the composite material, the carbon coating layer of this mass percentage is beneficial to regulate the size of the single-core multi-shell lithium manganese iron phosphate composite material, preventing it from agglomerating to form large particles in the subsequent treatment process, and effectively improving the conductivity of the single-core multi-shell lithium manganese iron phosphate composite material, thereby improving the electrochemical properties of the composite material. If the content of the carbon coating layer is too low, the coating is incomplete, which is not conducive to improving the structural and performance stability of the single-core multi-shell lithium manganese iron phosphate composite material; if the content of the carbon coating layer is too high, then the excessive coating of the single-core multi-shell lithium manganese iron phosphate composite material by the carbon coating layer will hinder the performance of the material, and will also reduce the content of the lithium manganese iron phosphate material in the composite material, thereby reducing the energy density of the material. In some specific embodiments, in the single-core multi-shell lithium manganese iron phosphate composite material, the mass percentage of the carbon coating layer includes but is not limited to 1 wt %, 2 wt %, 3 wt %, and so on.

In some embodiments, the preparation method of the lithium-containing multi-phosphate cathode material further includes the following steps:

In step S30: a plurality of single-core multi-shell lithium manganese iron phosphate composite materials with different sizes are prepared using the same method, in the plurality of single-core multi-shell lithium manganese iron phosphate composite materials, the particle sizes of the cores are different, the thicknesses of respective coating layers are different, and the numbers of layers of the lithium manganese iron phosphate coating layers are the same or different; and In step S40: the plurality of single-core multi-shell lithium manganese iron phosphate composite materials are mixed to form the lithium-containing multi-phosphate cathode material.

The plurality of single-core multi-shell lithium manganese iron phosphate composite materials with different sizes are prepared using the same method in this embodiment, and the particle sizes of the cores thereof are different, the thicknesses of respective coating layers are different, and the numbers of layers of the lithium manganese iron phosphate coating layers are the same or different. The plurality of single-core multi-shell lithium manganese iron phosphate composite materials with the same or similar structure but different sizes are then mixed to obtain the lithium-containing multi-phosphate cathode material. Through a synergistic effect of the plurality of single-core multi-shell lithium manganese iron phosphate composite materials with the same or similar structure but different sizes, the lithium-containing multi-phosphate cathode material has better comprehensive electrochemical properties such as electrical conductivity, energy density, and compaction density.

In some embodiments, in the above-mentioned step S30, the step of preparing a plurality of different single-core multi-shell lithium manganese iron phosphate composite materials of different sizes includes: preparing three types of single-core multi-shell lithium manganese iron phosphates composite materials having the same structure but different sizes, namely a first composite material, a second composite material, and a third composite material.

In some embodiments, in the first composite material, the second composite material, and the third composite material, the ratio between particle sizes of the cores is (1-1.05):(2-2.1):(4-4.2), and the ratios between the thicknesses of the respective coating layers are independently (1-1.05):(2-2.1):(4-4.2). That is, the core of the second composite material, the plurality of lithium manganese iron phosphate coating layers, and the carbon coating layer are successively prepared with a ratio of (1-1.05):(2-2.1) between the particle sizes of the cores and the thicknesses of the respective coating layers of the first composite material and the second composite material; and the core of the third composite material, the plurality of lithium manganese iron phosphate coating layers, and the carbon coating layer are successively prepared with a ratio of (1-1.05):(4-4.2) between the particle sizes of the cores and the thicknesses of the respective coating layers of the first composite material and the third composite material. With the three composite materials having the same or similar structure but different sizes as the lithium-containing multi-phosphate cathode material, the small-sized composite material can be filled in the gap of the large-sized composite materials to form a gradation, which not only ensures the electrochemical performance of the lithium-containing multi-phosphate cathode material, but also helps to improve the overall compaction density and energy density of the lithium-containing multi-phosphate cathode material.

In some embodiments, in above-mentioned step S40, the step of mixing comprises: the first composite material, the second composite material, and the first composite material are mixed at a mass ratio of 1:(2-4):(5-7), and the mixture is gradated in a ball mill to obtain a lithium-containing multi-phosphate cathode material. In the first composite material, the second composite material, and the third composite material in the embodiment of the present application, the particle sizes of respective cores and the thicknesses of respective coating layers have a ratio of (1-1.05):(2-2.1):(4-4.2), thus with the same or similar structure but different sizes of the composite materials, a gradation is carried out according to a mass ratio of 1:(2-4):(5-7), so that a better gradation among the composite materials of three sizes can be achieved, facilitating improving the compaction density and electrochemical performance of the lithium-containing multi-phosphate cathode material. In some specific embodiments, in the lithium-containing multi-phosphate cathode material, the mass ratio between the first composite material, the second composite material, and the third composite material includes but is not limited to 1:2:5, 1:2:6, 1:2:7, 1:3:5, 1:3:6, 1:3:7, 1:4:5, 1:4:6, 1:4:7, and the like.

In some embodiments, the first composite material, the second composite material, and the third composite material all include eight lithium manganese iron phosphate coating layers, and molar ratios of manganese to iron in the eight lithium manganese iron phosphate coating layers from inside to outside in the radial direction are successively 1:(9-8), 2:(8-7), 3:(7-6), 4:(6-5), 5:(5-4), 6:(4-3), 7:(3-2), and 8:(2-1).

In some embodiments, in the first composite material, the second composite material, and the third composite material, a mass ratio between the core, the lithium manganese iron phosphate coating layer having a manganese-iron ratio of 8:(2-1), the lithium manganese iron phosphate coating layer having a manganese-iron ratio of 7:(3-2), the lithium manganese iron phosphate coating layer having a manganese-iron ratio of 6:(4-3), the lithium manganese iron phosphate coating layer having a manganese-iron ratio of 5:(5-4), the lithium manganese iron phosphate coating layer having a manganese-iron ratio of 4:(6-5), the lithium manganese iron phosphate coating layer having a manganese-iron ratio of 3:(7-6), the lithium manganese iron phosphate coating layer having a manganese-iron ratio of 2:(8-7), and the lithium manganese iron phosphate coating layer having a manganese-iron ratio of 1:(9-8) is (1-10):(1-20):(3-13):1:1:1:1:1:1. In the embodiment of the present application, by adjusting the ratio between each lithium manganese iron phosphate coating layer, the ratio of the overall manganese to iron in the composite materials and the lithium-containing multi-phosphate cathode material can be adjusted, the core and the lithium manganese iron phosphate coating layers with different ratios of manganese to iron form the coating layers according to the above ratios, so that the molar ratio of manganese to iron in the lithium-containing multi-phosphate cathode material is 6:4, and this ratio is conducive to simultaneously ensuring the comprehensive properties such as the electrical conductivity, energy density, and compaction density of the lithium-containing multi-phosphate cathode material.

In some embodiments, the first composite material, the second composite material, and the third composite material all include eight lithium manganese iron phosphate coating layers, and in the composite materials, mass ratios of the core to the eight lithium manganese iron phosphate coating layers from inside to outside in the radial direction are successively 1:(9-8), 2:(8-7), 3:(7-6), 4:(6-5), 5:(5-4), 6:(4-3), 7:(3-2), and 8:(2-1). Within the range of the mass ratio between the eight layers of lithium manganese iron phosphate coating layers provided in this embodiment, a suitable thickness of each lithium manganese iron phosphate coating layer is ensured, and each lithium manganese iron phosphate coating layer can be more tightly bound, thereby increasing the compaction density of the lithium-containing multi-phosphate cathode material, resulting in good structural stability, and therefore leading to superior electrochemical performance and cycle performance.

In some embodiments, the ratio between the particle sizes of the first composite material, the second composite material, and the third composite material is (1.8-8):(3-16):(7-32), the three composite materials with particle sizes of this ratio can form a continuous gradation, and particles of the composite materials are continuously successively distributed from large to small, with an appropriate proportion of each grade. The mixed cathode active material formed according to this particle size ratio is beneficial to enhancing the compaction density and overall electrochemical performance of the lithium-containing multi-phosphate cathode material. In some embodiments, the ratio between the particle sizes of the first composite material, the second composite material, and the third composite material includes but is not limited to (2-7):(3-15):(8-31), (2-6):(3-15):(8-31), (2-5):(3-14):(8-30), (3-7):(4-15):(10-31), and the like.

A third aspect of the embodiment of the present application provides a secondary battery, the cathode material of the secondary battery contains the above-mentioned lithium-containing multi-phosphate cathode material, or contains a lithium-containing multi-phosphate cathode material prepared by the above-mentioned method.

Since the secondary battery provided in the third aspect of the embodiment of the present application includes the above-mentioned lithium-containing multi-phosphate cathode material, and the lithium-containing multi-phosphate cathode material has better electrochemical properties such as energy density, electrical conductivity, compaction density, safety, and stability, thus the electrochemical performance of the secondary battery can be improved.

In order to make details and operation of the above-mentioned implementation to be clearly understood by those skilled in the art, and to show the improved performance of the lithium-containing multi-phosphate cathode material and preparation method thereof, and the secondary battery of the embodiments of the application, the above technical proposals are illustrated by various exemplary examples below.

Example 1

A lithium-containing multi-phosphate cathode material includes a single-core multi-shell lithium manganese iron phosphate composite particle, the lithium manganese iron phosphate composite material includes a lithium iron phosphate core, eight intermediate lithium manganese iron phosphate coating layers, and an outermost carbon coating layer. The molar ratio of manganese to iron in each lithium manganese iron phosphate coating layer is 1:9, 2:8, 3:7, 4:6, 5:5, 6:4, 7:3, and 8:2. The particle size of lithium manganese iron phosphate particles in the core of lithium manganese iron phosphate ranges from 300 nm to 340 nm, and the particle sizes of lithium manganese iron phosphate particles in each layer of lithium manganese phosphate coating layer from inside to outside in the radial direction range from 280 nm to 320 nm, from 240 nm to 280 nm, from 200 nm to 240 nm, from 160 nm to 200 nm, from 120 nm to 160 nm, from 80 nm to 120 nm, from 50 nm to 80 nm, and from 20 nm to 50 nm, respectively. The radius of the lithium manganese iron phosphate core ranges from 320 nm to 360 nm, and the thicknesses of the successive lithium manganese iron phosphate coating layers radially from inside to outside range from 280 nm to 320 nm, from 240 nm to 280 nm, from 200 nm to 240 nm, from 160 nm to 200 nm, from 120 nm to 160 nm, from 80 nm to 120 nm, from 500 nm to 800 nm, and from 320 nm to 800 nm. The thickness of the carbon coating layer ranges from 1 nm to 3 nm; the thickness of the carbon protective layer is <1 nm; the particle size of the lithium manganese iron phosphate composite particles ranges from 2.2 μm to 4.3 μm.

The preparation thereof includes the following steps:

(1) manganese phosphate and iron phosphate were provided, the molar ratios of manganese phosphate to iron phosphate were 0:10, 1:9, 2:8, 3:7, 4:6, 5:5, 6:4, 7:3, and 8:2 respectively, with a mass ratio between the above formulations of 1:1:1:1:1:1:1:5:8, the manganese phosphate and iron phosphate of above ratios were mixed into a raw material component, 2 g of carbon source was then added per 100 g of the raw material component, and the raw material components of respective ratio were mixed with the carbon source to form mixed materials; the mixed materials in which the molar ratio of manganese phosphate to iron phosphate were 0:10, 1:9, 2:8, 3:7, 4:6, 5:5, 6:4, 7:3, and 8:2 were roasted for 8 hrs at 650° C., 600° C., 550° C., 530° C., 500° C., 470° C., 440° C., 400° C., and 350° C. respectively, to obtain ferromanganese phosphate particles containing a carbon protective layer with molar ratios of manganese to iron of 0:10, 1:9, 2:8, 3:7, 4:6, 5:5, 6:4, 7:3, and 8:2 respectively;

(2) the ferromanganese phosphate particles with molar ratios of manganese to iron of 1:9, 2:8, 3:7, 4:6, 5:5, 6:4, 7:3, 8:2 were prepared into slurries through sand milling, the ferromanganese phosphate particles containing the carbon-containing protective layer with the molar ratio of manganese to iron of 0:10 were used as the cores, the slurries were coated successively on the surface of the cores by spray drying in the order of the molar ratios of manganese to iron from small to large, to obtain ferromanganese phosphate composite particles;

(3) according to the molar ratio of ferromanganese phosphate composite particles to lithium carbonate of 1:1, 500 g of the ferromanganese phosphate composite particles and 75 g of lithium carbonate were placed in a stirring tank, then 5 L of water was added to carry out heating and stirring treatment, the heating and stirring treatment was carried out at 70° C. to 90° C. for 3 hrs, at a pH value ranging from 6 to 9; after the reaction was completed, the slurries were transported to a sand mill for pulverizing treatment, and then spray-dried at a temperature ranging from 180° C. to 220° C. to obtain the lithium manganese iron phosphate composite particles; and (4) 20 g of the carbon source was added per 100 g of lithium manganese iron phosphate composite particles, and sintered at 650° C. for 8 hrs to form a carbon coating layer and obtain the lithium manganese iron phosphate cathode material.

Example 2

A lithium-containing multi-phosphate cathode material includes a single-core multi-shell lithium manganese iron phosphate composite particle, the lithium manganese iron phosphate composite material includes a lithium iron phosphate core, eight intermediate lithium manganese iron phosphate coating layers, and an outermost carbon coating layer. The molar ratio of manganese to iron in each lithium manganese iron phosphate coating layer is 1:9, 2:8, 3:7, 4:6, 5:5, 6:4, 7:3, and 8:2. The particle size of lithium manganese iron phosphate particles in the core of lithium manganese iron phosphate ranges from 300 nm to 340 nm, and the particle sizes of lithium manganese iron phosphate particles in each layer of lithium manganese phosphate coating layer from inside to outside in the radial direction range from 280 nm to 320 nm, from 240 nm to 280 nm, from 200 nm to 240 nm, from 160 nm to 200 nm, from 120 nm to 160 nm, from 80 nm to 120 nm, from 50 nm to 80 nm, and from 20 nm to 50 nm, respectively. The radius of the lithium manganese iron phosphate core ranges from 320 nm to 360 nm, and the thicknesses of the successive lithium manganese iron phosphate coating layers radially from inside to outside range from 280 nm to 320 nm, from 240 nm to 280 nm, from 200 nm to 240 nm, from 160 nm to 200 nm, from 120 nm to 160 nm, from 2080 nm to 3120 nm, from 2000 nm to 3200 nm, and from 320 nm to 800 nm. The thickness of the carbon coating layer ranges from 1 nm to 3 nm; the thickness of the carbon protective layer is <1 nm; the particle size of the lithium manganese iron phosphate composite particles ranges from 5.4 μm to 8.3 km.

The preparation thereof includes the following steps:

(1) manganese phosphate and iron phosphate were provided, molar ratios of manganese phosphate to iron phosphate were 0:10, 1:9, 2:8, 3:7, 4:6, 5:5, 6:4, 7:3, and 8:2, respectively, with a mass ratio between the above formulations of 1:1:1:1:1:1:1:13:20:1, the manganese phosphate and iron phosphate of above ratios were mixed into a raw material component, 2 g of carbon source was then added per 100 g of the raw material component, and the raw material components of respective ratio were mixed with the carbon source to form mixed materials; the mixed materials in which the molar ratio of manganese phosphate to iron phosphate were 0:10, 1:9, 2:8, 3:7, 4:6, 5:5, 6:4, 7:3, and 8:2 were roasted for 8 hrs at 650° C., 600° C., 550° C., 530° C., 500° C., 470° C., 440° C., 400° C., and 350° C., respectively, to obtain ferromanganese phosphate particles containing a carbon protective layer with molar ratios of manganese to iron of 0:10, 1:9, 2:8, 3:7, 4:6, 5:5, 6:4, 7:3, and 8:2, respectively;

(2) the ferromanganese phosphate particles with molar ratios of manganese to iron of 1:9, 2:8, 3:7, 4:6, 5:5, 6:4, 7:3, and 8:2 were prepared into slurries through sand milling, the ferromanganese phosphate particles containing the carbon-containing protective layer with the molar ratio of manganese to iron of 0:10 were used as the cores, the slurries were coated successively on the surface of the cores by spray drying in the order of the molar ratios of manganese to iron from small to large, to obtain ferromanganese phosphate composite particles;

(3) according to the molar ratio of ferromanganese phosphate composite particles to lithium carbonate of 1:1, 500 g of the ferromanganese phosphate composite particles and 75 g of lithium carbonate were placed in a stirring tank, then 5 L of water was added to carry out heating and stirring treatment, the heating and stirring treatment was carried out at a temperature ranging from 70° C. to 90° C. for 3 hrs, at a pH value ranging from 6 to 9; after the reaction was completed, the slurries were transported to a sand mill for pulverizing treatment, and then spray-dried at a temperature ranging from 180° C. to 220° C. to obtain the lithium manganese iron phosphate composite particles; and (4) 20 g of the carbon source was added per 100 g of lithium manganese iron phosphate composite particles, and sintered at 650° C. for 8 hrs to form a carbon coating layer and obtain the lithium manganese iron phosphate cathode material.

Example 3

A lithium-containing multi-phosphate cathode material includes a single-core multi-shell lithium manganese iron phosphate composite particle, the lithium manganese iron phosphate composite material includes a lithium iron phosphate core, eight intermediate lithium manganese iron phosphate coating layers, and an outermost carbon coating layer. The molar ratio of manganese to iron in each lithium manganese iron phosphate coating layer is 1:9, 2:8, 3:7, 4:6, 5:5, 6:4, 7:3, and 8:2. The particle size of lithium manganese iron phosphate particles in the core of lithium manganese iron phosphate ranges from 300 nm to 340 nm, and the particle sizes of lithium manganese iron phosphate particles in each layer of lithium manganese phosphate coating layer from inside to outside in the radial direction range from 280 nm to 320 nm, from 240 nm to 280 nm, from 200 nm to 240 nm, from 160 nm to 200 nm, from 120 nm to 160 nm, from 80 nm to 120 nm, from 50 nm to 80 nm, and from 20 nm to 50 nm, respectively. The radius of the lithium manganese iron phosphate core ranges from 320 nm to 360 nm, and the thicknesses of the successive lithium manganese iron phosphate coating layers radially from inside to outside range from 280 nm to 320 nm, from 240 nm to 280 nm, from 200 nm to 240 nm, from 160 nm to 200 nm, from 120 nm to 160 nm, from 80 nm to 120 nm, from 500 nm to 800 nm, and from 320 nm to 800 nm. The thickness of the carbon coating layer ranges from 1 nm to 3 nm; the thickness of the carbon protective layer is <1 nm; the particle size of the lithium manganese iron phosphate composite particles ranges from 2.2 μm to 4.3 μm.

The preparation thereof includes the following steps:

(1) manganese phosphate and iron phosphate were provided, molar ratios of manganese phosphate to iron phosphate were 0:10, 1:9, 2:8, 3:7, 4:6, 5:5, 6:4, 7:3, and 8:2, respectively, with a mass ratio between the above formulations of 1:1:1:1:1:1:1:5:8, the manganese phosphate and iron phosphate of above ratios were mixed into a raw material component, 2 g of carbon source was then added per 100 g of the raw material component, and the raw material components of respective ratio were mixed with the carbon source to form mixed materials; the mixed materials in which the molar ratio of manganese phosphate to iron phosphate were 0:10, 1:9, 2:8, 3:7, 4:6, 5:5, 6:4, 7:3, and 8:2 were roasted for 8 hrs at 650° C., 600° C., 550° C., 530° C., 500° C., 470° C., 4400 C, 400° C., and 350° C., respectively, to obtain ferromanganese phosphate particles containing a carbon protective layer with molar ratios of manganese to iron of 0:10, 1:9, 2:8, 3:7, 4:6, 5:5, 6:4, 7:3, and 8:2, respectively;

(2) the ferromanganese phosphate particles with molar ratios of manganese to iron of 1:9, 2:8, 3:7, 4:6, 5:5, 6:4, 7:3, and 8:2 were prepared into slurries through sand milling, the ferromanganese phosphate particles containing the carbon-containing protective layer with the molar ratio of manganese to iron of 0:10 were used as the cores, the slurries were coated successively on the surface of the cores by spray drying in the order of the molar ratios of manganese to iron from small to large, to obtain ferromanganese phosphate composite particles;

(3) according to a molar ratio of ferromanganese phosphate composite particles to lithium carbonate of 1:1, 500 g of the ferromanganese phosphate composite particles and 75 g of lithium carbonate were placed in a stirring tank, then 5 L of water was added to carry out heating and stirring treatment, the heating and stirring treatment was carried out at a temperature ranging from 70° C. to 90° C. for 3 hrs, at a pH value ranging from 6 to 9; after the reaction was completed, the slurries were transported to a sand mill for pulverizing treatment, and then spray-dried at a temperature ranging from 180° C. to 220° C. to obtain the lithium manganese iron phosphate composite particles; and (4) 20 g of the carbon source was added per 100 g of lithium manganese iron phosphate composite particles, and sintered at 700° C. for 8 hrs to form a carbon coating layer and obtain the lithium manganese iron phosphate cathode material.

Example 4

A lithium-containing multi-phosphate cathode material includes three types of single-core multi-shell lithium manganese iron phosphate composite particles which have similar structures and different sizes, namely a first composite material, a second composite material, and a third composite material, the three lithium manganese iron phosphate composite materials include a lithium iron phosphate core, eight intermediate lithium manganese iron phosphate coating layers, and an outermost carbon coating layer.

The preparation thereof includes the following steps:

(1) manganese phosphate and iron phosphate with a concentration higher than 99% were used as raw materials, and were formulated according to nine molar ratios of manganese to iron of 8:2, 7:3, 6:4, 5:5, 4:6, 3:7, 2:8, 1:9, and 0:10, a mass ratio between the above formulation was 1:20:1:1:1:1:1:1:1; the manganese and iron raw materials of above ratios were mixed with lithium carbonate into a raw material component, 2 g of carbon source was then added per 100 g of the raw material component, and the raw material components of respective ratio were mixed with the carbon source to form mixed materials; the mixed materials in which the molar ratio of manganese to iron were 0:10, 1:9, 2:8, 3:7, 4:6, 5:5, 6:4, 7:3, and 8:2 were roasted for 8 hrs at 600° C., 560° C., 530° C., 500° C., 470° C., 440° C., 410° C., 380° C., and 350° C. respectively, to obtain carbon-coated lithium iron phosphate or carbon-coated lithium manganese iron phosphate having manganese-iron ratios of 0:10, 1:9, 2:8, 3:7, 4:6, 5:5, 6:4, 7:3, and 8:2 respectively and corresponding particle sizes ranging from 360 nm to 400 nm, from 320 nm to 360 nm, from 280 nm to 320 nm, from 240 nm to 280 nm, from 200 nm to 240 nm, from 160 nm to 200 nm, from 120 nm to 160 nm, from 80 nm to 120 nm, and from 50 nm to 80 nm;

(2) the carbon-coated lithium iron phosphate was used as the core, and the synthesized carbon-coated lithium manganese iron phosphate with different ratios was made into slurry by sand milling, and the slurries were successively coated on the surface of the core in the order of the manganese-iron ratio from low to high to form a plurality of carbon-coated lithium manganese iron phosphate coating layers, and first coated particles were obtained;

(3) the first coated particles was mixed with the carbon source and then roasted at 650° C. for 8 hrs to form a carbon coating layer to obtain a first composite material with a particle size ranging from 3.33 μm to 4.41 μm; the particle size of the core ranged from 360 nm to 400 nm, and the thickness of the coating layer with a manganese-iron-lithium ratio of 1:9 ranged from 320 nm to 360 nm, the thickness of the coating layer with a manganese-iron-lithium ratio of 2:8 ranged from 280 nm to 320 nm, the thickness of the coating layer with a manganese-iron-lithium ratio of 3:7 ranged from 240 nm to 280 nm, the thickness of the coating layer with a manganese-iron-lithium ratio of 4:6 ranged from 200 nm to 240 nm, the thickness of the coating layer with a manganese-iron-lithium ratio of 5:5 ranged from 160 nm to 200 nm, the thickness of the coating layer with a manganese-iron-lithium ratio of 6:4 ranged from 120 nm to 160 nm, the thickness of the coating layer with a manganese-iron-lithium ratio of 7:3 ranged from 1600 nm to 2400 nm, and the thickness of the coating layer with a manganese-iron-lithium ratio of 8:2 ranged from 50 nm to 80 nm; the thickness of the carbon coating layer ranged from 1 nm to 3 nm, and the content of the carbon coating layer in the first composite material ranged from 1 wt % to 3 wt %;

(4) a second composite material having the same structure and different sizes of core particle and coating layers was formed using the method of steps (2) and (3), and the particle size ranged from 6.66 μm to 8.82 μm; the particle size of the core ranged from 720 nm to 800 nm, and the thickness of the coating layer with a manganese-iron-lithium ratio of 1:9 ranged from 640 nm to 720 nm, the thickness of the coating layer with a manganese-iron-lithium ratio of 2:8 ranged from 560 nm to 640 nm, the thickness of the coating layer with a manganese-iron-lithium ratio of 3:7 ranged from 480 nm to 560 nm, the thickness of the coating layer with a manganese-iron-lithium ratio of 4:6 ranged from 400 nm to 480 nm, the thickness of the coating layer with a manganese-iron-lithium ratio of 5:5 ranged from 320 nm to 400 nm, the thickness of the coating layer with a manganese-iron-lithium ratio of 6:4 ranged from 240 nm to 320 nm, the thickness of the coating layer with a manganese-iron-lithium ratio of 7:3 ranged from 3200 nm to 4800 nm, and the thickness of the coating layer with a manganese-iron-lithium ratio of 8:2 ranged from 100 nm to 160 nm; the thickness of the carbon coating layer ranged from 1 nm to 3 nm, and the content of the carbon coating layer in the second composite material ranged from 1 wt % to 3 wt %;

(5) a third composite material having the same structure and different sizes of core particle and coating layers was formed using the method of steps (2) and (3), and the particle size ranged from 13.32 μm to 17.64 μm; the particle size of the core ranged from 1440 nm to 1600 nm, and the thickness of the coating layer with a manganese-iron-lithium ratio of 1:9 ranged from 1280 nm to 1440 nm, the thickness of the coating layer with a manganese-iron-lithium ratio of 2:8 ranged from 1180 nm to 1280 nm, the thickness of the coating layer with a manganese-iron-lithium ratio of 3:7 ranged from 960 nm to 1280 nm, the thickness of the coating layer with a manganese-iron-lithium ratio of 4:6 ranged from 800 nm to 960 nm, the thickness of the coating layer with a manganese-iron-lithium ratio of 5:5 ranged from 640 nm to 800 nm, the thickness of the coating layer with a manganese-iron-lithium ratio of 6:4 ranged from 480 nm to 640 nm, the thickness of the coating layer with a manganese-iron-lithium ratio of 7:3 ranged from 6400 nm to 9600 nm, and the thickness of the coating layer with a manganese-iron-lithium ratio of 8:2 ranged from 200 nm to 320 nm; the thickness of the carbon coating layer ranged from 1 nm to 3 nm, and the content of the carbon coating layer in the third composite material ranged from 1 wt % to 3 wt %; and (6) the first composite material, the second composite material, and the third composite material prepared in steps 3 to 5 were cooled, pulverized, and sieved, and then the particles of three sizes were mixed according to a mass ratio between the first composite material, the second composite material, and the third composite material of 1:3:6, after mixing, the mixture was put into a ball mill for powder grading, and the gradated materials were dried and packaged to obtain the final product, that is, the lithium-containing multi-phosphate cathode material. The molar ratio of manganese to iron in the lithium-containing multi-phosphate cathode material was 6:4.

Example 5

A lithium-containing multi-phosphate cathode material includes three types of single-core multi-shell lithium manganese iron phosphate composite particles which have similar structures and different sizes, namely a first composite material, a second composite material, and a third composite material, the three lithium manganese iron phosphate composite materials include a lithium iron phosphate core, eight intermediate lithium manganese iron phosphate coating layers, and an outermost carbon coating layer.

The differences from Example 1 are that:

in step (1), nine molar ratios of manganese to iron at 8:2, 7:3, 6:4, 5:5, 4:6, 3:7, 2:8, 1:9, and 0:10 were prepared, and the mass ratio therebetween was correspondingly 10:1:10:1:1:1:1:1:1.

in step (3), the first coated particles were coated with a carbon source and then roasted at 650° C. for 8 hrs to form a carbon coating layer, the particle size of the obtained first composite material ranged from 3.34 μm to 4.32 μm; the particle size of the core ranged from 360 nm to 400 nm, and the thickness of the coating layer with a manganese-iron-lithium ratio of 1:9 ranged from 320 nm to 360 nm, the thickness of the coating layer with a manganese-iron-lithium ratio of 2:8 ranged from 280 nm to 320 nm, the thickness of the coating layer with a manganese-iron-lithium ratio of 3:7 ranged from 240 nm to 280 nm, the thickness of the coating layer with a manganese-iron-lithium ratio of 4:6 ranged from 200 nm to 240 nm, the thickness of the coating layer with a manganese-iron-lithium ratio of 5:5 ranged from 160 nm to 200 nm, the thickness of the coating layer with a manganese-iron-lithium ratio of 6:4 ranged from 1200 nm to 1600 nm, the thickness of the coating layer with a manganese-iron-lithium ratio of 7:3 ranged from 80 nm to 120 nm, and the thickness of the coating layer with a manganese-iron-lithium ratio of 8:2 ranged from 500 nm to 800 nm; the thickness of the carbon coating layer ranged from 1 nm to 3 nm, and the content of the carbon coating layer in the first composite material ranged from 1 wt % to 3 wt %;

in step (4), a second composite material having different sizes of core particle and coating layers was formed using the method of steps (2) and (3), and the particle size ranged from 6.68 m to 8.64 μm; the particle size of the core ranged from 720 nm to 800 nm, and the thickness of the coating layer with a manganese-iron-lithium ratio of 1:9 ranged from 640 nm to 720 nm, the thickness of the coating layer with a manganese-iron-lithium ratio of 2:8 ranged from 560 nm to 640 nm, the thickness of the coating layer with a manganese-iron-lithium ratio of 3:7 ranged from 480 nm to 560 nm, the thickness of the coating layer with a manganese-iron-lithium ratio of 4:6 ranged from 400 nm to 480 nm, the thickness of the coating layer with a manganese-iron-lithium ratio of 5:5 ranged from 320 nm to 400 nm, the thickness of the coating layer with a manganese-iron-lithium ratio of 6:4 ranged from 2400 nm to 3200 nm, the thickness of the coating layer with a manganese-iron-lithium ratio of 7:3 ranged from 160 nm to 240 nm, and the thickness of the coating layer with a manganese-iron-lithium ratio of 8:2 ranged from 1000 nm to 1600 nm; the thickness of the carbon coating layer ranged from 1 nm to 3 nm, and the content of the carbon coating layer in the second composite material ranged from 1 wt % to 3 wt %;

in step (5), a third composite material having different sizes of core particle and coating layers was formed, and the particle size ranged from 13.36 μm to 17.28 μm; the particle size of the core ranged from 1440 nm to 1600 nm, and the thickness of the coating layer with a manganese-iron-lithium ratio of 1:9 ranged from 1280 nm to 1440 nm, the thickness of the coating layer with a manganese-iron-lithium ratio of 2:8 ranged from 1180 nm to 1280 nm, the thickness of the coating layer with a manganese-iron-lithium ratio of 3:7 ranged from 960 nm to 1280 nm, the thickness of the coating layer with a manganese-iron-lithium ratio of 4:6 ranged from 800 nm to 960 nm, the thickness of the coating layer with a manganese-iron-lithium ratio of 5:5 ranged from 640 nm to 800 nm, the thickness of the coating layer with a manganese-iron-lithium ratio of 6:4 ranged from 4800 nm to 6400 nm, the thickness of the coating layer with a manganese-iron-lithium ratio of 7:3 ranged from 320 nm to 480 nm, and the thickness of the coating layer with a manganese-iron-lithium ratio of 8:2 ranged from 2000 nm to 3200 nm; the thickness of the carbon coating layer ranged from 1 nm to 3 nm, and the content of the carbon coating layer in the third composite material ranged from 1 wt % to 3 wt %; and in step (6), the first composite material, the second composite material, and the third composite material prepared in steps 3 to 5 were cooled, pulverized, and sieved, and then the particles of three sizes were mixed according to a mass ratio between the first composite material, the second composite material, and the third composite material of 1:3:6, after mixing, the mixture was put into a ball mill for powder grading, and the gradated materials were dried and packaged to obtain the final product, that is, the lithium-containing multi-phosphate cathode material. The molar ratio of manganese to iron in the lithium-containing multi-phosphate cathode material was 6:4.

Example 6

A lithium-containing multi-phosphate cathode material includes three types of single-core multi-shell lithium manganese iron phosphate composite particles which have similar structures and different sizes, namely a first composite material, a second composite material, and a third composite material, the three lithium manganese iron phosphate composite materials include a lithium iron phosphate core, eight intermediate lithium manganese iron phosphate coating layers, and an outermost carbon coating layer.

The differences from Example 1 are that:

in step (1), nine molar ratios of manganese to iron at 8:2, 7:3, 6:4, 5:5, 4:6, 3:7, 2:8, 1:9, and 0:10 were prepared, and the mass ratio therebetween was correspondingly 6:8:6:1:1:1:1:1:1.

in step (3), the first coated particles were coated with a carbon source and then roasted at 650° C. for 8 hrs to form a carbon coating layer, the particle size of the obtained first composite material ranged from 3.34 μm to 4.32 μm; the particle size of the core ranged from 360 nm to 400 nm, and the thickness of the coating layer with a manganese-iron-lithium ratio of 1:9 ranged from 320 nm to 360 nm, the thickness of the coating layer with a manganese-iron-lithium ratio of 2:8 ranged from 280 nm to 320 nm, the thickness of the coating layer with a manganese-iron-lithium ratio of 3:7 ranged from 240 nm to 280 nm, the thickness of the coating layer with a manganese-iron-lithium ratio of 4:6 ranged from 200 nm to 240 nm, the thickness of the coating layer with a manganese-iron-lithium ratio of 5:5 ranged from 160 nm to 200 nm, the thickness of the coating layer with a manganese-iron-lithium ratio of 6:4 ranged from 720 nm to 960 nm, the thickness of the coating layer with a manganese-iron-lithium ratio of 7:3 ranged from 640 nm to 960 nm, and the thickness of the coating layer with a manganese-iron-lithium ratio of 8:2 ranged from 300 nm to 480 nm; the thickness of the carbon coating layer ranged from 1 nm to 3 nm, and the content of the carbon coating layer in the first composite material ranged from 1 wt % to 3 wt %;

in step (4), a second composite material having a similar structure and different sizes of core particle and coating layers was formed using the method of steps (2) and (3), and the particle size ranged from 6.68 μm to 8.64 μm; the particle size of the core ranged from 720 nm to 800 nm, and the thickness of the coating layer with a manganese-iron-lithium ratio of 1:9 ranged from 640 nm to 720 nm, the thickness of the coating layer with a manganese-iron-lithium ratio of 2:8 ranged from 560 nm to 640 nm, the thickness of the coating layer with a manganese-iron-lithium ratio of 3:7 ranged from 480 nm to 560 nm, the thickness of the coating layer with a manganese-iron-lithium ratio of 4:6 ranged from 400 nm to 480 nm, the thickness of the coating layer with a manganese-iron-lithium ratio of 5:5 ranged from 320 nm to 400 nm, the thickness of the coating layer with a manganese-iron-lithium ratio of 6:4 ranged from 1440 nm to 1920 nm, the thickness of the coating layer with a manganese-iron-lithium ratio of 7:3 ranged from 1280 nm to 1920 nm, and the thickness of the coating layer with a manganese-iron-lithium ratio of 8:2 ranged from 600 nm to 960 nm; the thickness of the carbon coating layer ranged from 1 nm to 3 nm, and the content of the carbon coating layer in the second composite material ranged from 1 wt % to 3 wt %;

in step (5), a third composite material having different sizes of core particle and coating layers was formed, and the particle size ranged from 13.36 μm to 17.28 μm; the particle size of the core ranged from 1440 nm to 1600 nm, and the thickness of the coating layer with a manganese-iron-lithium ratio of 1:9 ranged from 1280 nm to 1440 nm, the thickness of the coating layer with a manganese-iron-lithium ratio of 2:8 ranged from 1180 nm to 1280 nm, the thickness of the coating layer with a manganese-iron-lithium ratio of 3:7 ranged from 960 nm to 1280 nm, the thickness of the coating layer with a manganese-iron-lithium ratio of 4:6 ranged from 800 nm to 960 nm, the thickness of the coating layer with a manganese-iron-lithium ratio of 5:5 ranged from 640 nm to 800 nm, the thickness of the coating layer with a manganese-iron-lithium ratio of 6:4 ranged from 2800 nm to 3840 nm, the thickness of the coating layer with a manganese-iron-lithium ratio of 7:3 ranged from 2560 nm to 3840 nm, and the thickness of the coating layer with a manganese-iron-lithium ratio of 8:2 ranged from 1200 nm to 1920 nm; the thickness of the carbon coating layer ranged from 1 nm to 3 nm, and the content of the carbon coating layer in the third composite material ranged from 1 wt % to 3 wt %; and in step (6), the first composite material, the second composite material, and the third composite material prepared in steps 3 to 5 were cooled, pulverized, and sieved, and then the particles of three sizes were mixed according to a mass ratio between the first composite material, the second composite material, and the third composite material of 1:3:6, after mixing, the mixture was put into a ball mill for powder grading, and the gradated materials were dried and packaged to obtain the final product, that is, the lithium-containing multi-phosphate cathode material. The molar ratio of manganese to iron in the lithium-containing multi-phosphate cathode material was 6:4.

Example 7

A lithium-containing multi-phosphate cathode material includes three types of single-core multi-shell lithium manganese iron phosphate composite particles which have similar structures and different sizes, namely a first composite material, a second composite material, and a third composite material, the three lithium manganese iron phosphate composite materials include a lithium iron phosphate core, eight intermediate lithium manganese iron phosphate coating layers, and an outermost carbon coating layer.

The differences from Example 1 are that:

in step (1), four molar ratios of manganese to iron at 8:2, 7:3, 6:4, and 0:10 were prepared, and the mass ratio therebetween was correspondingly 12:1:1:4;

in step (3), the roasting temperature was 650° C. to obtain a first composite material, and the particle size thereof ranged from 3.32 μm to 4.32 μm; the particle size of the core ranged from 1440 nm to 1600 nm, and the thickness of the coating layer with a manganese-iron-lithium ratio of 1:9 ranged from 320 nm to 360 nm, the thickness of the coating layer with a manganese-iron-lithium ratio of 2:8 ranged from 280 nm to 320 nm, the thickness of the coating layer with a manganese-iron-lithium ratio of 3:7 ranged from 240 nm to 280 nm, the thickness of the coating layer with a manganese-iron-lithium ratio of 4:6 ranged from 200 nm to 240 nm, the thickness of the coating layer with a manganese-iron-lithium ratio of 5:5 ranged from 160 nm to 200 nm, the thickness of the coating layer with a manganese-iron-lithium ratio of 6:4 ranged from 120 nm to 160 nm, the thickness of the coating layer with a manganese-iron-lithium ratio of 7:3 ranged from 80 nm to 120 nm, and the thickness of the coating layer with a manganese-iron-lithium ratio of 8:2 ranged from 600 nm to 760 nm; the thickness of the carbon coating layer ranged from 1 nm to 3 nm, and the content of the carbon coating layer in the first composite material ranged from 1 wt % to 3 wt %;

in step (4), a second composite material having a similar structure and different sizes of core particle and coating layers was formed using the method of steps (2) and (3), and the particle size ranged from 6.68 μm to 8.64 μm; the particle size of the core ranged from 2880 nm to 3200 nm, and the thickness of the coating layer with a manganese-iron-lithium ratio of 1:9 ranged from 640 nm to 720 nm, the thickness of the coating layer with a manganese-iron-lithium ratio of 2:8 ranged from 560 nm to 640 nm, the thickness of the coating layer with a manganese-iron-lithium ratio of 3:7 ranged from 480 nm to 560 nm, the thickness of the coating layer with a manganese-iron-lithium ratio of 4:6 ranged from 400 nm to 480 nm, the thickness of the coating layer with a manganese-iron-lithium ratio of 5:5 ranged from 320 nm to 400 nm, the thickness of the coating layer with a manganese-iron-lithium ratio of 6:4 ranged from 240 nm to 320 nm, the thickness of the coating layer with a manganese-iron-lithium ratio of 7:3 ranged from 160 nm to 240 nm, and the thickness of the coating layer with a manganese-iron-lithium ratio of 8:2 ranged from 1200 nm to 1520 nm; the thickness of the carbon coating layer ranged from 1 nm to 3 nm, and the content of the carbon coating layer in the second composite material ranged from 1 wt % to 3 wt %;

in step (5), a third composite material having different sizes of core particle and coating layers was formed, and the particle size ranged from 13.36 μm to 17.28 μm; the particle size of the core ranged from 5760 nm to 6400 nm, and the thickness of the coating layer with a manganese-iron-lithium ratio of 1:9 ranged from 1280 nm to 1440 nm, the thickness of the coating layer with a manganese-iron-lithium ratio of 2:8 ranged from 1180 nm to 1280 nm, the thickness of the coating layer with a manganese-iron-lithium ratio of 3:7 ranged from 960 nm to 1280 nm, the thickness of the coating layer with a manganese-iron-lithium ratio of 4:6 ranged from 800 nm to 960 nm, the thickness of the coating layer with a manganese-iron-lithium ratio of 5:5 ranged from 640 nm to 800 nm, the thickness of the coating layer with a manganese-iron-lithium ratio of 6:4 ranged from 480 nm to 640 nm, the thickness of the coating layer with a manganese-iron-lithium ratio of 7:3 ranged from 320 nm to 480 nm, and the thickness of the coating layer with a manganese-iron-lithium ratio of 8:2 ranged from 2400 nm to 3040 nm; the thickness of the carbon coating layer ranged from 1 nm to 3 nm, and the content of the carbon coating layer in the third composite material ranged from 1 wt % to 3 wt %; and in step (6), the first composite material, the second composite material, and the third composite material prepared in steps 3 to 5 were cooled, pulverized, and sieved, and then the particles of three sizes were mixed according to a mass ratio between the first composite material, the second composite material, and the third composite material of 1:3:6, after mixing, the mixture was put into a ball mill for powder grading, and the gradated materials were dried and packaged to obtain the final product, that is, the lithium-containing multi-phosphate cathode material. The molar ratio of manganese to iron in the lithium-containing multi-phosphate cathode material was 6:4.

Comparative Example 1

A lithium-containing multi-phosphate cathode material, which includes lithium manganese iron phosphate particles and a carbon coating layer coated on the surface of each of the lithium manganese iron phosphate particles; the molar ratio of manganese to iron in the lithium manganese iron phosphate particles is 6:4, the particle size ranges from 3.4 μm to 4.7 μm, and the thickness of the carbon coating layer ranges from 1 nm to 3 nm.

The preparation method thereof includes the following steps:

(1) iron phosphate, manganese phosphate, and lithium carbonate were prepared;
(2) the iron phosphate, manganese phosphate, and lithium carbonate were mixed at a molar ratio of manganese phosphate to iron phosphate of 6:4, and the mixture was sintered at 800° C. for 12 hrs to obtain lithium manganese iron phosphate particles; and
(3) 20 g of a carbon source was added per 100 g of lithium manganese iron phosphate particles, and the lithium manganese iron phosphate particles were mixed with the carbon source and sintered at a temperature of 700° C. for 8 hrs to form a carbon coating layer and obtain the lithium manganese iron phosphate cathode material.

Comparative Example 2

A lithium-containing multi-phosphate cathode material, which includes lithium manganese iron phosphate composite particles and a carbon coating layer coated on the surface of each of the lithium manganese iron phosphate composite particles; the lithium manganese iron phosphate composite particles include a lithium manganese iron phosphate core and eight lithium manganese iron phosphate coating layers coated on the surface of the lithium manganese iron phosphate core.

The molar ratios of manganese to iron in the lithium manganese iron phosphate core and the eight lithium manganese iron phosphate coating layers are all 6:4; the particle size of the lithium manganese iron phosphate particles in the lithium manganese iron phosphate core ranges from 300 nm to 340 nm, and the particle sizes of the lithium manganese iron phosphate particles in respective lithium manganese iron phosphate coating layers from inside to outside along the radial direction range successively from 280 nm to 320 nm, from 240 nm to 280 nm, from 200 nm to 240 nm, from 160 nm to 200 nm, from 120 nm to 160 nm, from 80 nm to 120 nm, from 50 nm to 80 nm, and from 20 nm to 50 nm; the thickness of the carbon coating layer ranges from 1 nm to 3 nm; the thickness of the carbon protective layer is <1 nm; the particle size of the lithium manganese iron phosphate composite particles ranges from 2.2 μm to 4.3 μm.

The preparation method thereof includes the following steps:

(1) manganese phosphate and iron phosphate were provided, manganese phosphate and iron phosphate were mixed into a raw material component with a molar ratio of manganese to iron of 6:4, 2 g of a carbon source was added per 100 g of the raw material component, and the raw material component and the carbon source were mixed to form a mixed material, the mixed material was portioned with a mass ratio of 1:1:1:1:1:1:1:5:8, and roasted for 8 hrs at 650° C., 600° C., 550° C., 530° C., 500° C., 470° C., 440° C., 400° C., 350° C., respectively, to obtain ferromanganese phosphate particles containing a carbon protective layer with nine different particle sizes;
(2) the ferromanganese phosphate particle with the largest particle size was used as the core, and the ferromanganese phosphate particles with a carbon-containing protective layer and other 8 different particle sizes were prepared into slurries by sand milling, and the slurries were coated on the surface of the core successively in the order of particle size from large to small by spray drying to obtain the lithium manganese iron phosphate composite particles;
(3) according to a molar ratio of ferromanganese phosphate composite particles to lithium carbonate of 1:1, 500 g of the ferromanganese phosphate composite particles and 75 g of lithium carbonate were placed in a stirring tank, then 5 L of water was added to carry out heating and stirring treatment, the heating and stirring treatment was carried out at a temperature ranging from 70° C. to 90° C. for 3 hrs, at a pH value ranging from 6 to 9; after the reaction was completed, the slurries were transported to a sand mill for pulverizing treatment, and then spray-dried at a temperature ranging from 180° C. to 220° C. to obtain the lithium manganese iron phosphate composite particles; and
(4) 20 g of the carbon source was added per 100 g of lithium manganese iron phosphate composite particles, and the mixture of lithium manganese iron phosphate composite particles and the carbon source was sintered at 650° C. for 8 hrs to form a carbon coating layer and obtain the lithium manganese iron phosphate cathode material.

Comparative Example 3

A lithium-containing multi-phosphate cathode material, which includes lithium manganese iron phosphate composite particles and a carbon coating layer coated on the surface of each of the lithium manganese iron phosphate composite particles; the lithium manganese iron phosphate composite particles include a lithium manganese iron phosphate core and eight lithium manganese iron phosphate coating layers coated on the surface of the lithium manganese iron phosphate core.

The molar ratio of manganese to iron in the lithium manganese iron phosphate core and the eight lithium manganese iron phosphate coating layers is 8:2; the molar ratios of manganese to iron in the eight lithium manganese iron phosphate coating layers are 7:3, 6:4, 5:5, 4:6, 3:7, 2:8, and 1:9 from the inside to the outside in the radial direction; the particle size of the lithium manganese iron phosphate particles in the lithium manganese iron phosphate core is 300 nm to 340 nm, and the particle sizes of the lithium manganese iron phosphate particles in respective lithium manganese iron phosphate coating layers from inside to outside along the radial direction range successively from 280 nm to 320 nm, from 240 nm to 280 nm, from 200 nm to 240 nm, from 160 nm to 200 nm, from 120 nm to 160 nm, from 80 nm to 120 nm, from 50 nm to 80 nm, and from 20 nm to 50 nm; the thickness of the carbon coating layer is 1 nm to 3 nm; the thickness of the carbon protective layer is <1 nm; the particle size of the lithium manganese iron phosphate composite particles ranges from 2.2 μm to 4.3 μm.

The preparation thereof includes the following steps:

(1) manganese phosphate and iron phosphate were provided, the molar ratios of manganese phosphate to iron phosphate were 0:10, 1:9, 2:8, 3:7, 4:6, 5:5, 6:4, 7:3, and 8:2 respectively, with a mass ratio between the above formulations of 1:1:1:1:1:1:1:5:8, the manganese phosphate and iron phosphate of above ratios were mixed into a raw material component, 2 g of carbon source was then added per 100 g of the raw material component, and the raw material components of respective ratios were mixed with the carbon source to form mixed materials; the mixed materials in which the molar ratio of manganese phosphate to iron phosphate were 0:10, 1:9, 2:8, 3:7, 4:6, 5:5, 6:4, 7:3, and 8:2 were roasted for 8 hrs at 350° C., 400° C., 440° C., 470° C., 500° C., 530° C., 550° C., 600° C., and 650° C. respectively, to obtain ferromanganese phosphate particles containing a carbon protective layer with molar ratios of manganese to iron of 0:10, 1:9, 2:8, 3:7, 4:6, 5:5, 6:4, 7:3, and 8:2 respectively;

(2) the ferromanganese phosphate particle with the largest particle size was used as the core, and the ferromanganese phosphate particles with a carbon-containing protective layer and other 8 different particle sizes were prepared into slurries by sand milling, and the slurries were coated on the surface of the core successively in the order of particle size from large to small by spray drying to obtain the lithium manganese iron phosphate composite particles;

(3) according to a molar ratio of ferromanganese phosphate composite particles to lithium carbonate of 1:1, 500 g of the ferromanganese phosphate composite particles and 75 g of lithium carbonate were placed in a stirring tank, then 5 L of water was added to carry out heating and stirring treatment, the heating and stirring treatment was carried out at a temperature ranging from 70° C. to 90° C. for 3 hrs, at a pH value ranging from 6 to 9; after the reaction was completed, the slurries were transported to a sand mill for pulverizing treatment, and then spray-dried at a temperature ranging from 180° C. to 220° C. to obtain the lithium manganese iron phosphate composite particles; and (4) 20 g of the carbon source was added per 100 g of lithium manganese iron phosphate composite particles, and the mixture of lithium manganese iron phosphate composite particles and the carbon source was sintered at 650° C. for 8 hrs to form a carbon coating layer and obtain the lithium manganese iron phosphate cathode material.

In order to verify the progress of the embodiments of the present application, a powder pressure test and an electrical property test were carried out on the finished products of the lithium-containing multi-phosphate cathode material prepared in the examples and the comparative examples, respectively.

1. Powder pressure test: 1 g of the finished product of the lithium-containing multi-phosphate cathode material prepared in each example and comparative example was weighted respectively, the test compaction densities at a pressure of 10 MPa (by 3T pressure sensor) are as shown in Table 1.

TABLE 1

| Tested object | Items<br>Compaction Density g/cm$^3$ |
|---|---|
| Example 1 | 2.402 |
| Example 2 | 2.413 |
| Example 3 | 2.436 |
| Example 4 | 2.716 |
| Example 5 | 2.715 |
| Example 6 | 2.716 |
| Example 7 | 2.715 |
| Comparative Example 1 | 2.385 |
| Comparative Example 2 | 2.401 |
| Comparative Example 3 | 2.403 |

As can be found from the above test results, the lithium-containing multi-phosphate cathode materials prepared in Examples 1-7 of the present application all had a higher compaction density, particularly, the lithium-containing multi-phosphate cathode materials prepared in Examples 4-7 included three types of single-core multi-shell lithium manganese iron phosphate composite materials with different sizes that form a gradation significantly improved the compaction density of the lithium-containing multi-phosphate cathode materials.

2. Battery performance tests: the lithium-containing multi-phosphate cathode material particles prepared in the above examples and comparative examples were adopted, and assembled into batteries according to the following methods:

The preparation of the cathode sheet: the lithium-containing multi-phosphate cathode material, SP (conductive carbon black), PVDF (polyvinylidene fluoride), and NMP (N-methylpyrrolidone) at a mass ratio of 93.5:2.5:4:100 were evenly mixed by stirring for 2 hrs with a ball mill to obtain a cathode slurry; the prepared cathode slurry was coated on an aluminum foil, leveled with a scraper, dried at 130° C., and rolled to obtain a cathode sheet.

Battery assembly process: the prepared cathode was adhered on the cathode metal case with a conductive glue, a metal lithium sheet was used as the anode, a Celgard 2400 microporous membrane was used as the separator, $LiPF_6$ solution of 1.0 mol/L was used as the electrolyte, and the solvent of the electrolyte was a mixture of ethylene carbonate (EC), diethyl carbonate (DEC), and ethyl methyl carbonate (EMC) with a volume ratio of 1:1:1, and a button cell was assembled in a glove box.

The electrochemical performance of the above-mentioned button cell was tested using a LAND electrochemical tester, the charging cut-off voltage was 4.2 V, and the discharge cut-off voltage was 2.0 V. The test results are shown in Table 2 below.

TABLE 2

| Tested object | Items | | | |
|---|---|---|---|---|
| | 0.1 C Discharge mAh · $g^{-1}$ (25° C.) | 0.1 C Specific Energy wh/kg (25° C.) | 1 C Specific Energy wh/kg (25° C.) | Resistivity (Ω · cm) |
| Example 1 | 160.2 | 600.5 | 566.4 | / |
| Example 2 | 160.1 | 600.3 | 564.3 | / |
| Example 3 | 159.6 | 598.5 | 560.6 | / |
| Example 4 | 157.6 | 593.2 | 568.6 | 3.3 |
| Example 5 | 158.1 | 596.5 | 570.4 | 3.1 |
| Example 6 | 156.9 | 591.4 | 567.3 | 3.2 |
| Example 7 | 156.4 | 589.9 | 566.1 | 3.2 |
| Comparative Example 1 | 154.1 | 570.3 | 528.3 | / |
| Comparative Example 2 | 154.3 | 572.3 | 530.5 | / |
| Comparative Example 3 | 112.1 | 403.6 | 392.4 | / |

As can be found from the above test results, in the lithium-containing multi-phosphate cathode material prepared by Examples 1-3 of the present application, the manganese-iron molar ratio in the core and each of the lithium manganese iron phosphate coating layers increases successively from inside to outside along the radial direction, namely lithium manganese iron phosphate with a lower manganese content is arranged in the inner layer, and lithium manganese iron phosphate with a higher manganese content is arranged in the outer layer, that is, lithium manganese iron phosphate with higher conductivity is placed in the inner layer, and lithium manganese iron phosphate with lower conductivity is placed on the outer layer, so that the structure is stable and the compaction density is high, additionally, the lithium manganese iron phosphate particles with poor conductivity are placed in the outer layer, which shortens the transmission distance of lithium ions and improves the conductivity. The material has excellent electrochemical properties such as the electrical properties and volumetric energy density.

Compared with Examples 1-3, the lithium manganese iron phosphate particles in the lithium-containing multi-phosphate cathode material provided by Comparative Example 1 do not include the single-core multi-shell structure, and the compaction density thereof is apparently lower than that in Examples 1-3, with poor structural stability. At the same time, the lithium manganese iron phosphate particles are formed by sintering directly after mixing the iron source, manganese source, and lithium source in Comparative Example 1, so that the conductivity of the lithium manganese iron phosphate particles is low. Therefore, the overall electrical properties such as volumetric energy density and discharge of the battery provided by Comparative Example 1 are significantly lower than those in Examples 1-3. In the lithium manganese iron phosphate composite particles in the lithium-containing multi-phosphate cathode material provided in Comparative Example 2, since the molar ratio of manganese to iron in the core and each of the lithium manganese iron phosphate coating layers is the same, and the particle size of the lithium manganese iron phosphate particles in the core and each of the lithium manganese iron phosphate coating layers decreases successively from the inside to the outside in the radial direction, although the compaction density can be equivalent to the examples of the present application when coated with multiple layers, however, the lithium ion transmission distance in the high-temperature sintered lithium manganese iron phosphate particles becomes longer so that the electrical performance reduces; and since the manganese-iron molar ratio of the core and each of the lithium manganese iron phosphate coating layers is identical, the electrical conductivity of the lithium manganese iron phosphate composite particles is lower, so the overall electrical properties such as volumetric energy density and discharge of the battery provided by Comparative Example 2 are significantly lower than those in Examples 1-3. In the lithium manganese iron phosphate composite particles in the lithium-containing multi-phosphate cathode material provided by Comparative Example 3, since the molar ratio of the manganese to iron in the core and each of the lithium manganese iron phosphate coating layers decreases successively from the inside to the outside in the radial direction, that is, lithium manganese iron phosphate with a higher manganese content is placed in the inner layer, and lithium manganese iron phosphate with a low manganese content is placed in the outer layer, namely lithium manganese iron phosphate with lower conductivity is placed in the inner layer, and lithium manganese iron phosphate with higher conductivity is placed in the inner layer. Since the lithium-ion transmission distance is increased during high-temperature sintering, although the low-manganese content lithium manganese iron phosphate particles are coated on the outer layer have a small particle size and excellent electrical properties, however, the upper limit of the electrical properties of lithium manganese iron phosphate is limited, and is unable to solve the problem of the impact on the electrical properties caused by the poor conductivity of the lithium manganese iron phosphate particles with high manganese content placed in the inner layer, so the overall electrical properties such as the volume energy density and discharge of the battery provided in Comparative Example 3 are significantly lower than those in Examples 1-3.

In addition, the lithium-containing multi-phosphate cathode materials prepared by the Examples 4-7 of the present application, through the synergistic effect of the single-core multi-shell lithium manganese iron phosphate composite materials having three different sizes, are capable of exhibiting simultaneously excellent comprehensive electrochemical properties such as electrical conductivity, energy density and compaction density.

The above are merely optional embodiments of this application, and are not intended to limit the application. For those skilled in the art, various modifications and changes may me made based on the present application. Any modifications, equivalent replacements, improvements, etc. made within the spirit and principles of the present application shall fall within the scope of the claims of the present application.

What is claimed is:

1. A lithium-containing multi-phosphate cathode material, comprising a single-core multi-shell lithium manganese iron phosphate composite material, wherein the single-core multi-shell lithium manganese iron phosphate composite material comprises:

a core made of lithium iron phosphate or lithium manganese iron phosphate,

N lithium manganese iron phosphate coating layers coated on an outer surface of the core, and a carbon coating layer coated on an outermost layer of the single-core multi-shell lithium manganese iron phosphate composite material;

wherein N is an integer ranging from 6 to 10;

wherein a manganese content in the N lithium manganese iron phosphate coating layers increases successively from an inside to an outside along a radial direction;

wherein the lithium manganese iron phosphate coating layers include lithium manganese iron phosphate particles, and particle sizes of the lithium manganese iron phosphate particles in the N lithium manganese iron phosphate coating layers decrease successively from the inside to the outside along the radial direction; and wherein molar ratios of manganese element to iron element in the N lithium manganese iron phosphate coating layers are independently (1-9):(9-1).

2. The lithium-containing multi-phosphate cathode material according to claim 1, wherein a molar ratio of manganese element to iron element in the core is (0-1):(2-9); and/or a molar ratio of manganese element to iron element in the lithium-containing multi-phosphate cathode material is 6:4.

3. The lithium-containing multi-phosphate cathode material according to claim 2, wherein N is 8; and the molar ratios of manganese to iron in the N lithium manganese iron phosphate coating layers from the inside to the side in the radial direction are respectively 1:(9-8), 2:(8-7), 3:(7-6), 4:(6-5), 5:(5-4), 6:(4-3), 7:(3-2), and 8:(2-1).

4. The lithium-containing multi-phosphate cathode material according to claim 1, wherein the lithium-containing multi-phosphate cathode material comprises a plurality of single-core multi-shell lithium manganese iron phosphate composite materials having different sizes; and wherein in the plurality of single-core multi-shell lithium manganese iron phosphate composite materials, particle sizes of respective cores are different, and thicknesses of respective coating layers are different, numbers of layers of the lithium manganese iron phosphate coating layers are the same or different.

5. The lithium-containing multi-phosphate cathode material according to claim 4, wherein the lithium-containing multi-phosphate cathode material comprises three single-core multi-shell lithium manganese iron phosphate composite materials with the same structure and different sizes, namely a first composite material, a second composite material, and a third composite material.

6. The lithium-containing multi-phosphate cathode material according to claim 5, wherein in the first composite material, the second composite material, and the third composite material, a ratio between the particle sizes of the cores is (1-1.05):(2-2.1):(4-4.2), and a ratio between the thicknesses of respective coating layers is (1-1.05):(2-2.1):(4-4.2).

7. The lithium-containing multi-phosphate cathode material according to claim 5, wherein in the lithium-containing multi-phosphate cathode material, a mass ratio between the first composite material, the second composite material, and the third composite material is 1:(2-4):(5-7); and/or wherein in the lithium-containing multi-phosphate cathode material, a ratio between particle sizes of the first composite material, the second composite material, and the third composite material is (1.8-8):(3-16):(7-32).

8. The lithium-containing multi-phosphate cathode material according to claim 7, wherein at least one of the first composite material, the second composite material, and the third composite material contains eight lithium manganese iron phosphate coating layers, the particle sizes of the lithium manganese iron phosphate particles in the eight lithium manganese iron phosphate coating layers from the inside to the outside along the radial direction are respectively in a range from 320 nm to 360 nm, from 280 nm to 320 nm, from 240 nm to 280 nm, from 200 nm to 240 nm, from 160 nm to 200 nm, from 120 nm to 240 nm, from 80 nm to 120 nm, and from 50 nm to 80 nm; and/or the particle size of the first composite material ranges from 1.8 μm to 8 μm; the particle size of the second composite material ranges from 3 μm to 16 μm; and the particle size of the third composite material ranges from 7 μm to 32 μm.

9. The lithium-containing multi-phosphate cathode material according to claim 8, wherein the first composite material, the second composite material, and the third composite material all contain eight lithium manganese iron phosphate coating layers.

10. The lithium-containing multi-phosphate cathode material according to claim 9, wherein in the first composite material, the particle size of the core ranges from 360 nm to 1600 nm, and molar ratios of manganese to iron in the eight lithium manganese iron phosphate coating layers from the inside to the outside in the radial direction are respectively 1:(9-8), 2:(8-7), 3:(7-6), 4:(6-5), 5:(5-4), 6:(4-3), 7:(3-2) and 8:(2-1), and thicknesses are respectively in a range from 320 nm to 360 nm, from 280 nm to 320 nm, from 240 nm to 280 nm, from 200 nm to 240 nm, from 160 nm to 200 nm, from 120 nm to 1600 nm, from 80 nm to 2400 nm, and from 50 nm to 800 nm; and/or in the second composite material, the particle size of the core ranges from 720 nm to 3200 nm, and molar ratios of manganese to iron in the eight lithium manganese iron phosphate coating layers from the inside to the outside along the radial direction are respectively 1:(9-8), 2:(8-7), 3:(7-6), 4:(6-5), 5:(5-4), 6:(4-3), 7:(3-2), and 8:(2-1), and thicknesses are respectively in a range from 640 nm to 720 nm, from 560 nm to 640 nm, from 480 nm to 560 nm, from 400 nm to 480 nm, from 320 nm to 400 nm, from 240 nm to 3200 nm, from 160 nm to 4800 nm, and from 100 nm to 1600 nm; and/or in the third composite material, the particle size of the core ranges from 1440 nm to 6400 nm, and molar ratios of manganese to iron in the eight lithium manganese iron phosphate coating layers from the inside to the outside along the radial direction are respectively 1:(9-8), 2:(8-7), 3:(7-6), 4:(6-5), 5:(5-4), 6:(4-3), 7:(3-2), and 8:(2-1), and thicknesses are respectively in a range from 1280 nm to 1440 nm, from 1120 nm to 1280 nm, from 960 nm to 1120 nm, from 800 nm to 960 nm, from 640 nm to 800 nm, from 480 nm to 6400 nm, from 320 nm to 9600 nm, and from 200 nm to 3200 nm.

11. The lithium-containing multi-phosphate cathode material according to claim 1, wherein in the single-core multi-shell lithium manganese iron phosphate composite material, a mass percentage of the carbon coating layer ranges from 1 wt % to 3 wt %; and/or a thickness of the carbon coating layer ranges from 1 nm to 3 nm; and/or the core is selected from carbon-coated lithium iron phosphate or carbon-coated lithium manganese iron phosphate, wherein the mass percentage of a carbon-coated material ranges from 1 wt % to 3 wt %; and/or the lithium manganese iron phosphate particles are selected from carbon-coated lithium manganese iron phosphate particles, wherein a mass percentage of a carbon-coated material ranges from 1 wt % to 3 wt %.

12. A preparation method for the lithium-containing multi-phosphate cathode material according to claim 1, comprising:

preparing lithium manganese iron phosphate composite particles, wherein the lithium manganese iron phosphate composite particles have a core made of lithium iron phosphate or lithium manganese iron phosphate, and N lithium manganese iron phosphate coating layers on an outer surface of the core, wherein a manganese content in the N lithium manganese iron phosphate coating layers increases successively from an inside to an outside along a radial direction, and particle sizes of the lithium manganese iron phosphate particles decrease successively from the inside to the outside along the radial direction; and N is an integer ranging from 6 to 10; and coating a carbon coating layer on a surface of an outermost layer of the lithium manganese iron phosphate coating layers to obtain a single-core multi-shell lithium manganese iron phosphate composite material, namely the lithium-containing multi-phosphate cathode material.

13. The preparation method for the lithium-containing multi-phosphate cathode material according to claim 12, wherein the step of preparing the lithium manganese iron phosphate composite particles further comprises:

preparing separately lithium iron phosphate particles and lithium manganese iron phosphate particles with different manganese-iron ratios; and using the lithium iron phosphate particles or the lithium manganese iron phosphate particles as the core, and successively coating the lithium manganese iron phosphate particles with the different manganese-iron ratios on the outer surface of the core, such that a manganese content increases from the inside to the outside along the radial direction, to form the N lithium manganese iron phosphate coating layers so as to obtain the lithium manganese iron phosphate composite particles;

alternatively, the step of preparing the lithium manganese iron phosphate composite particles further comprises:

using ferric phosphate or ferromanganese phosphate as the core, and coating N ferromanganese phosphate coating layers on a surface of the core to obtain ferromanganese phosphate composite particles; and mixing the ferromanganese phosphate composite particles and a lithium source, and carrying out a hydrothermal reaction to obtain the lithium manganese iron phosphate composite particles.

14. The preparation method for the lithium-containing multi-phosphate cathode material according to claim 13, further comprising:

preparing a plurality of single-core multi-shell lithium manganese iron phosphate composite materials with different sizes using the same method, wherein in the plurality of single-core multi-shell lithium manganese iron phosphate composite materials, particles sizes of respective cores are different, and thicknesses of respective coating layers are different, and numbers of layers of the lithium manganese iron phosphate coating layers are the same or different; and mixing the plurality of single-core multi-shell lithium manganese iron phosphate composite materials to form the lithium-containing multi-phosphate cathode material.

15. The preparation method for the lithium-containing multi-phosphate cathode material according to claim 14, wherein the step of preparing a plurality of single-core multi-shell lithium manganese iron phosphate composite materials with different sizes comprises: preparing three single-core multi-shell lithium manganese iron phosphate composite materials with the same structure but different sizes, namely a first composite material, a second composite material, and a third composite material; and/or wherein the step of mixing comprises: mixing the first composite material, the second composite material, and the third composite material at a mass ratio of 1:(2-4):(5-7), and carrying out powder grading in a ball mill, so as to obtain the lithium-containing multi-phosphate cathode material.

16. The preparation method for the lithium-containing multi-phosphate cathode material according to claim 15, wherein in the first composite material, the second composite material, and the third composite material, a ratio between particle sizes of respective cores is (1-1.05):(2-2.1):(4-4.2), and ratios between thicknesses of respective coating layers are independently (1-1.05):(2-2.1):(4-4.2); and/or a ratio between particle sizes of the first composite material, the second composite material, and the third composite material is (1.8-8):(3-16):(7-32).

17. The preparation method for the lithium-containing multi-phosphate cathode material according to claim 16, wherein the first composite material, the second composite material, and the third composite material all contain eight lithium manganese iron phosphate coating layers; and molar ratios of manganese to iron in the eight lithium manganese iron phosphate coating layers from the inside to the outside in the radial direction are respectively 1:(9-8), 2:(8-7), 3:(7-6), 4:(6-5), 5:(5-4), 6:(4-3), 7:(3-2) and 8:(2-1).

18. The preparation method for a for the lithium-containing multi-phosphate cathode material according to claim 17, wherein the step of preparing the lithium manganese iron phosphate particles with different manganese-iron ratios comprises:

mixing a manganese source and an iron source with a lithium source and a carbon source at a molar ratio of the manganese source to the iron source of 1:(9-8), 2:(8-7), 3:(7-6), 4:(6-5), 5:(5-4), 6:(4-3), 7:(3-2), or 8:(2-1), and sintering respectively to obtain the lithium manganese iron phosphate particles with different manganese-iron ratios; and/or wherein when preparing the lithium manganese iron phosphate particles with different manganese-to-iron ratios, the sintering temperature decreases as the manganese content increases, and when the molar ratio of the manganese source to the iron source is 1:(9-8), 2:(8-7), 3:(7-6), 4:(6-5), 5:(5-4), 6:(4-3), 7:(3-2), or 8:(2-1), corresponding sintering temperature is in a range from 560° C. to 600° C., from 530° C. to 560° C., from 500° C. to 530° C., from 470° C. to 500° C., from 440° C. to 470° C., from 410° C. to 440° C., from 380° C. to 410° C., or from 350° C. to 380° C.

19. The preparation method for the lithium-containing multi-phosphate cathode material according to claim 13, wherein the hydrothermal reaction is carried out at conditions comprising: a pH value ranging from 6 to 9, a reaction temperature ranging from 70° C. to 90° C., and a reaction duration ranging from 1 hr to 3 hrs.

20. A secondary battery, wherein a cathode material of the secondary battery comprises the lithium-containing multi-phosphate cathode material according to claim 1.

* * * * *